US009858096B2

(12) United States Patent
Bannai et al.

(10) Patent No.: US 9,858,096 B2
(45) Date of Patent: Jan. 2, 2018

(54) COMMUNICATION DEVICE MIGRATION METHOD OF EXTENSION FUNCTION AND COMMUNICATION SYSTEM

(71) Applicant: Alaxala Networks Corporation, Kanagawa (JP)

(72) Inventors: Ryou Bannai, Tokyo (JP); Ryoji Furuhashi, Tokyo (JP); Hiroto Oogaki, Tokyo (JP)

(73) Assignee: Alaxala Networks Corporation, Kanagawa (JP)

( * ) Notice: Subject to any disclaimer, the term of this patent is extended or adjusted under 35 U.S.C. 154(b) by 179 days.

(21) Appl. No.: 14/604,795

(22) Filed: Jan. 26, 2015

(65) Prior Publication Data

US 2015/0215384 A1 Jul. 30, 2015

(30) Foreign Application Priority Data

Jan. 27, 2014 (JP) .................................. 2014-012156
Jan. 5, 2015 (JP) .................................. 2015-000036

(51) Int. Cl.
G06F 15/16 (2006.01)
G06F 9/455 (2006.01)
H04L 12/911 (2013.01)
H04L 12/24 (2006.01)

(52) U.S. Cl.
CPC ...... G06F 9/45533 (2013.01); H04L 41/0813 (2013.01); H04L 47/783 (2013.01)

(58) Field of Classification Search
CPC .. G06F 9/45533; H04L 41/0813; H04L 47/83

USPC ........................................................ 709/201
See application file for complete search history.

(56) References Cited

U.S. PATENT DOCUMENTS

| | | | | |
|---|---|---|---|---|
| 5,848,411 A | * | 12/1998 | Yamagishi | ............ G06F 9/5083 |
| 2002/0112102 A1 | | 8/2002 | Tarui et al. | |
| 2010/0002713 A1 | | 1/2010 | Yoshino et al. | |
| 2010/0031258 A1 | * | 2/2010 | Takano | ................. G06F 9/4856 718/1 |
| 2010/0221946 A1 | | 9/2010 | Neumetzler et al. | |

(Continued)

FOREIGN PATENT DOCUMENTS

JP 2002-215408 8/2002
JP 2002-281072 9/2002

*Primary Examiner* — SM Rahman
(74) *Attorney, Agent, or Firm* — Mattingly & Malur, PC

(57) ABSTRACT

A communication device includes a transfer control unit and a function execution module having a physical processor. The communication device migrates a first process execution unit operated by the function execution module and a management memory to a function execution module of a migration destination. The function execution module notifies the function execution module of the migration destination of information to specify a program allocated to a second process execution unit and information regarding allocation of the physical processor. The function execution module of the migration destination downloads a program file to start the second process execution unit, operates a program of a new second process execution unit by the function execution module of the migration destination, discards the temporary data on the memory of the second process execution unit, and migrates the second process execution unit to the function execution module of the migration destination.

15 Claims, 16 Drawing Sheets

(56) References Cited

U.S. PATENT DOCUMENTS

2011/0265164 A1\* 10/2011 Lucovsky ........... G06F 9/45533
  726/7
2012/0324442 A1 12/2012 Barde
2014/0059228 A1\* 2/2014 Parikh ................... G06F 9/5005
  709/226

\* cited by examiner

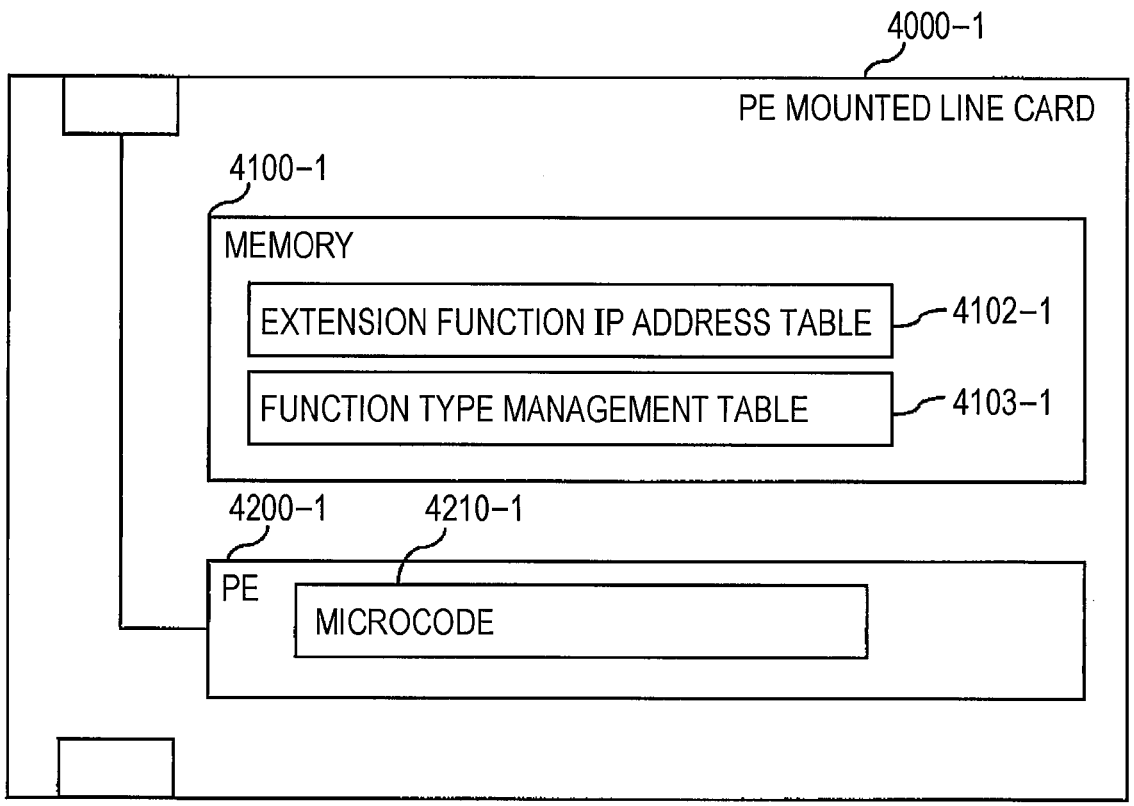

| FUNCTION EXECUTION CARD ID (31101) | IP ADDRESS (31102) |
|---|---|
| 1 | 192.168.101.2 |
| 2 | 192.168.102.2 |
| 3 | 192.168.201.2 |

| EXTENSION FUNCTION ID (31061) | IP ADDRESS (31062) |
|---|---|
| A | 10.1.1.1 |
| B | 10.1.2.1 |

COMMUNICATION DEVICE MIGRATION METHOD OF EXTENSION FUNCTION AND COMMUNICATION SYSTEM

CROSS-REFERENCE TO RELATED APPLICATION

This application claims the priority of Japanese Patent Application No. 2014-012156 filed Jan. 27, 2014 and the priority of Japanese Patent Application No. 2015-000036 filed Jan. 5, 2015, which are incorporated herein by reference in its entirety.

BACKGROUND OF THE INVENTION

1. Field of the Invention

The present invention relates to a communication device that exchanges packets with a network and more particularly, to a communication device that migrates an extension function between a plurality of function execution modules.

2. Description of the Related Art

Recently, with increasing use of computing resources using a network represented by cloud computing and multimedia use of the network, it has been requested to provide various services on the network. Under such circumstances, a function of providing various services by cooperation of a network device and a computer or other network device has been mounted generally on the network device. In addition, hardware for a packet transfer process is mounted generally on the network device to realize high performance of the network device. However, it is difficult for the hardware to flexibly correspond to the function of providing the various services.

As technology for adding a function to the network device on which the hardware is mounted, JP 2002-281072 A is known. JP 2002-281072 A discloses "a function execution module 62 executing an extension function is connected to a high-speed routing module 32 capable of executing a routing process by hardware, so that a function extension module 6 is configured. As a result, even when a packet having new address information is generated by processing of packet data by the function execution module 62, high-speed performance of a routing process for selecting a new routing destination of the packet and transferring the packet is maintained by the connected routing module 32 and a function extension by a scalable function extension module is enabled by connecting a plurality of function execution modules 62." (refer to ABSTRACT).

Meanwhile, use of virtual machine technology has increased to flexibly use the computing resources. As migration technology for migrating a virtual machine over a processor in a system using the virtual machine to correspond to a load change, US 2012/0324442, US 2010/0211946, and JP 2002-215408 A are known.

US 2012/0324442 discloses that a processor executes a process for mapping network switching functions of each of a plurality of virtual machines to a hardware network device (refer to ABSTRACT).

US 2010/0211946 discloses "the invention relates to networking and more specifically, to a method and system for network abstraction and virtualization for a single OS. The method according to the invention includes, in a network device including a single OS, a single or plurality of resources, and software operated at the outside of the single OS, abstracting the plurality of hardware resources to ensure compatibility between the plurality of hardware resources including the single OS. An embodiment will be described using FIG. 2A. FIG. 2A is a block diagram illustrating architecture 200 for hardware abstraction and virtualization for a single OS, in accordance with an embodiment of the invention. For example, the architecture 200 for the hardware abstraction and the virtualization for the single OS supports hardware resource abstraction or virtualization of a single OS. As illustrated in FIG. 2A, the architecture 200 includes hardware resources 202, an abstraction layer 204, an OS 206, a software partition 208, a plurality of virtual network interface controller drivers 210a, ..., and 210n, a software switching module 220, a physical network driver 222, and a physical storage driver 224. Next, the hardware resources 202 correspond to one or more physical elements or subsystems in the network device. The hardware resources 202 can configure a physical network interface controller and correspond to a networking subsystem in the network device or an element thereof." (refer to ABSTRACT).

JP 2002-215408 A discloses "individual I/O adapters and partitions are provided with a scheduling mechanism to control allocation of an I/O adapter to a partition in time division, a mechanism to allocate an I/O adapter to a partition in space division, and a mechanism with which a partition control program dynamically changes the allocations. The individual I/O adapters and partitions are further provided with a mechanism to measure input/output performance for each partition and a mechanism to store SLA of a user program, on the basis of the performance for each partition." (refer to ABSTRACT).

SUMMARY OF THE INVENTION

Even in a function execution card mounted on the network device, use of the virtual machine technology is considered to flexibly use the function of providing the services.

In addition, technology for securing performance of a transfer process by dividing a function of a control system requiring multifunctionality and a function of a control system requiring single functionality and high-speed performance as a control plane (CP) and a data plane (DP), respectively, and mounting the functions, in the network device, is known. Even in the function execution card mounted on the network device, it is considered to divide the CP and the DP and mount the CP and the DP as the different functions on one function execution card.

In the function execution card, when the virtual machine technology is used and the CP and the DP are divided and mounted, the CP can be mounted on the virtual machine. However, the DP cannot be mounted on the virtual machine to secure the performance of the transfer process. The DP may occupy partial cores of a processor and may be mounted outside an OS operated on the virtual machine or mounted on a HOST OS.

As such, in the CP and the DP mounted on the function execution card, when the migration technology of the virtual machine is used, the CP can be migrated together with the virtual machine, because the CP is mounted on the virtual machine. Meanwhile, because the DP is not mounted on the virtual machine, the DP cannot be migrated using the migration technology of the virtual machine.

The CP and the DP mounted on the function execution card share information necessary for control of the function managed by the CP and the DP refers to the information and executes only a transfer process by a destination search, so that a predetermined function is realized cooperatively. For this reason, an operation is disabled in a state in which only the CP is migrated using the migration technology of the virtual machine, when the migration of the function mounted on the function execution card is considered.

An object of the present invention is to provide a network device that can migrate a CP and a DP of a function execution card cooperatively.

An aspect of the present invention provides a communication device that is connected to a network and exchanges packets with the network. The communication device includes a transfer control unit that executes an exchange process of the packets with the network and a function execution module that has a physical processor. A transfer table in which a relation of destinations of the packets and output destinations of the packets is registered is held. The function execution module has a function execution unit mounting a predetermined extension function and the function execution unit has a first process execution unit executing a first process and a second process execution unit executing a second process. The extension function of the function execution unit is mounted by cooperation of the first process execution unit and the second process execution unit. Operation resources of the physical processor are allocated to the first process execution unit and the second process execution unit and memories of the physical processor are allocated to a program and data of the first process execution unit and a program and data of the second process execution unit. The first process execution unit is operated on a virtual machine constructed on the function execution module and the second process execution unit is operated outside the virtual machine on which the first process execution unit is operated. The communication device migrates the program and the data of the first process execution unit operated by the function execution module to a function execution module of a migration destination. The function execution module notifies the function execution module of the migration destination of information regarding the program allocated to the second process execution unit and information regarding allocation of the physical processor. The function execution module of the migration destination specifies a program allocated to the second process execution unit, on the basis of the notified information, operates a new second process execution unit by the function execution module of the migration destination, on the basis of the information regarding the allocation, and migrates the second process execution unit to the function execution module of the migration destination. The function execution unit is migrated to the function execution module of the migration destination by the migration of the first process execution unit and the second process execution unit to the function execution module of the migration destination. The transfer table is updated according to the migration of the function execution unit to the function execution module of the migration destination.

The present invention can provide a network device that can allocate a CP and a DP of a function execution module cooperatively.

BRIEF DESCRIPTION OF THE DRAWINGS

Other objects and advantages of the invention will become apparent from the following description of embodiments with reference to the accompanying drawings in which:

FIG. 4 is a diagram illustrating a PE mounted line card according to the first embodiment;

FIG. 5 is a diagram illustrating a function execution unit IP address management table according to the first embodiment;

FIG. 12 is a diagram illustrating a function execution card information management table according to the first embodiment;

FIG. 13 is a diagram illustrating a function execution unit IP address table according to the first embodiment;

DESCRIPTION OF THE PREFERRED EMBODIMENTS

First Embodiment

A first embodiment will be described using FIGS. 1 to 17 and 21. In this embodiment, the case in which a migration destination of a function operated by a function execution card (function execution module) is a function execution card in the same network device (communication device) will be described.

Figure 1:
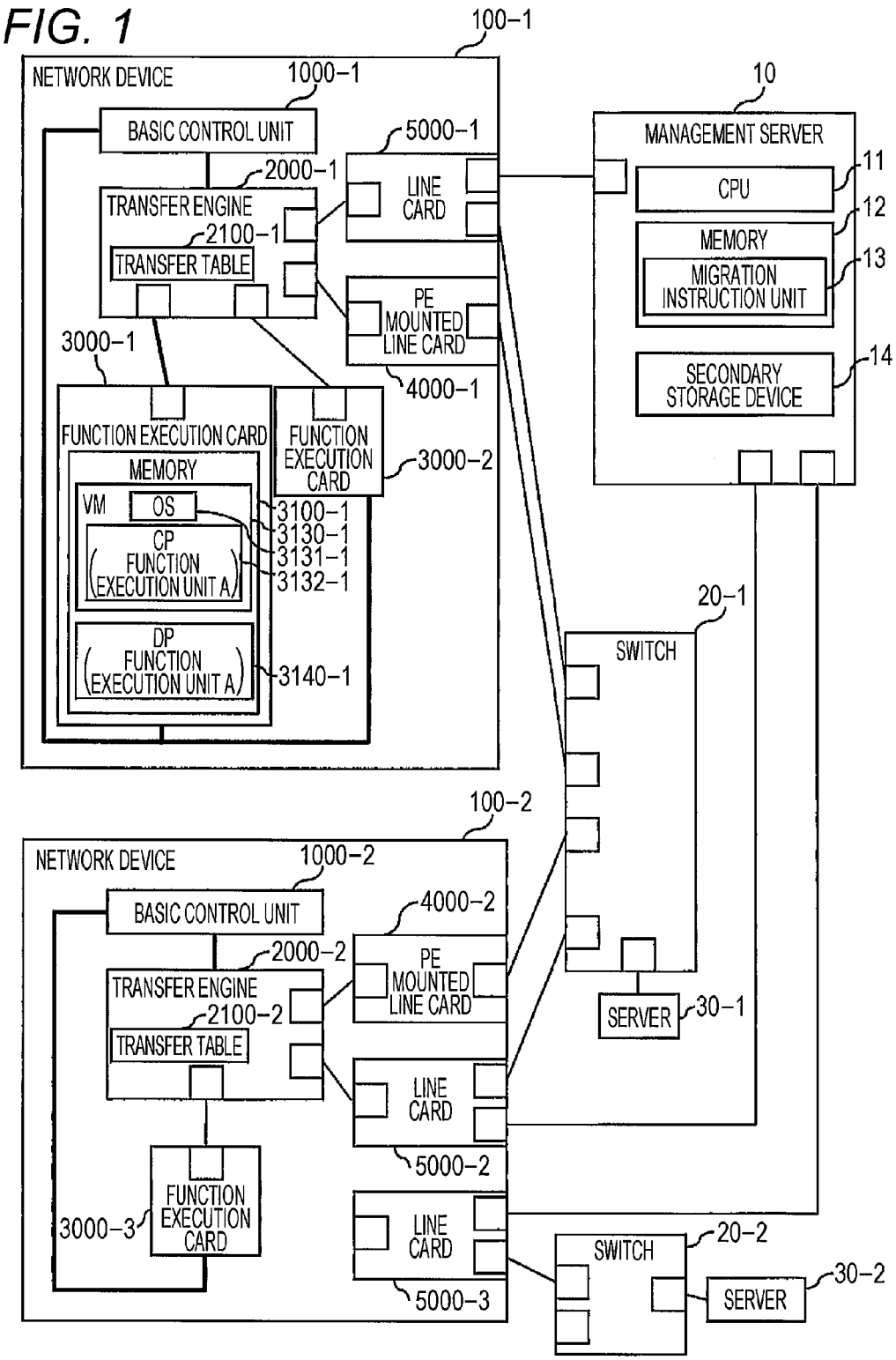
FIG. 1 is a diagram illustrating a network relay system according to a first embodiment.

FIG. 1 is a diagram illustrating a network relay system according to the first embodiment.

The network relay system has network devices 100-1 and 100-2. The network devices 100-1 and 100-2 are connected through a switch 20-1 and the network device 100-2 is connected to a switch 20-2. A server 30-1 is connected to the switch 20-1 and the network devices 100-1 and 100-2 exchange packets with the server 30-1. In addition, a server 30-2 is connected to the switch 20-2 and the network device 100-2 exchanges packets with the server 30-2. In addition, the network devices 100-1 and 100-2 are connected to a management server 10 through a network for management.

For the network devices 100-1 and 100-2, only the network device 100-1 will be described as an example.

The network device 100-1 has a basic control unit 1000-1, a transfer engine 2000-1, function execution cards 3000-1 and 3000-2, a PE mounted line card 4000-1, and a line card 5000-1. The network device 100-1 according to this embodiment may not have the PE mounted line card 4000-1 and the PE mounted line card 4000-1 is an element essential for a network device 100-1 according to a third embodiment.

The basic control unit 1000-1 controls the transfer engine 2000-1 and the PE mounted line card 4000-1. The basic control unit 1000-1 will be described in detail with reference to FIG. 2. The transfer engine 2000-1 refers to a transfer table 2100-1, determines a port becoming an output destination of a packet received by the network device 100-1, and outputs the received packet from the port. The transfer table 2100-1 holds an association of an IP address of a destination of a packet, a next hop of the packet, and a port outputting the packet. The transfer table 2100-1 will be described in detail with reference to FIG. 8.

Function execution units executing extension functions can be mounted on the function execution cards 3000-1 and 3000-2. FIG. 1 illustrates a state in which the function execution unit is mounted on the function execution card 3000-1 and the function execution unit is not mounted on the function execution card 3000-2. A function of a control system among the extension functions is mounted on a control plane (CP) 3132-1 and a function of a transfer system is mounted on a data plane (DP) 3140-1.

The CP 3132-1 and the DP 3140-1 cooperate with each other, so that an extension function A is mounted. For example, when an extension function is provided in cooperation with a server, the CP 3132-1 executes control communication with the server to set resources necessary for a data transfer process, sets data 3132-12 held on a memory according to an instruction from the server, and shares set memory information with the DP 3140-1 and the DP 3140-1 executes a high-speed data transfer process according to the set memory information. The DP 3140-1 temporarily holds data during the transfer. That is, a process of the DP 3140-1 is executed according to a result or a situation of the process of the CP 3132-1. An extension function B realized by a function execution unit B is also mounted on the function execution card 3000-1 (refer to FIG. 3). The extension function of the function execution unit is not mounted on other function execution cards 3000-2 and 3000-3. In addition, the extension function may be a process defined by a protocol of a layer equal to or higher than a layer 4 defined by OSI. The extension function may be an application to perform session control of an IP telephone or an application to inspect data of a packet. In addition, the extension function may be an application to perform band control to effectively use a band, optimization control of communication, or high-speed transfer control.

The CP 3132-1 is provided by an OS 3131-1 operated by a virtual machine (VM) 3130-1 constructed on a memory 3100-1 included in the function execution card 3000-1. In addition, the DP 3140-1 is operated at the outside of the virtual machine 3130-1. The function execution card 3000-1 will be described in detail with reference to FIG. 3. A configuration of a function execution unit on the memory 3100-1 will be described in detail with reference to FIG. 21.

The PE mounted line card 4000-1 has a port to connect the network device 100-1 to the switch 20 and functions as an interface with an external network. A process corresponding to a microcode 4210-1 (refer to FIG. 4) stored in a programmable engine (PE) 4200-1 (refer to FIG. 4) is executed. This process is a process for allocating a received packet to a function execution card corresponding to the packet. The process corresponding to the microcode 4210-1 is not limited thereto. If other microcode is stored in the PE 4200-1, other process is executed. The PE mounted line card 4000-1 will be described in detail with reference to FIG. 4.

The line card 5000-1 has a port connected to the management server 10 and a port connected to the switch 20-1 and functions as an interface with the external network.

The network device 100-2 has a basic control unit 1000-2, a transfer engine 2000-2, a function execution card 3000-3, a PE mounted line card 4000-2, and line cards 5000-2 and 5000-3. The line card 5000-3 has a port connected to the switch 20-2 and functions as an interface with the external network. Because the other configurations are the same as those of the basic control unit 1000-1, the transfer engine 2000-1, the function execution card 3000-2, the PE mounted line card 4000-1, and the line card 5000-1 of the network device 100-1, description thereof is omitted.

The network devices 100-1 and 100-2 may be connected to other switches not illustrated in the drawings and may be connected to other servers or terminals not illustrated in the drawings.

In addition, the function execution cards 3000-1 to 3000-3 are described. However, the function execution cards 3000-1 to 3000-3 are not limited to cards and may be function execution boards. In claims, a concept including the function execution card and the function execution board is described as a function execution module. Likewise, the line cards 5000-1 to 5000-3 are not limited to cards and may be line boards and in claims, a concept including the line card and the line board is described as a line module. Likewise, the PE mounted line cards 4000-1 and 4000-2 are not limited to cards and may be PE mounted line boards and in claims, a concept including the PE mounted line card and the PE mounted line board is described as a PE mounted line module.

Next, the management server 10 will be described.

The management server 10 is a computer that has a CPU 11, a memory 12, and a secondary storage device 14.

A program to realize a migration instruction unit 13 is stored in the memory 12 and the CPU 11 executes the program to mount the migration instruction unit 13. The migration instruction unit 13 transmits a migration instruction including identification information (extension function ID) of an extension function becoming a migration target and identification information (function execution card ID) of a function execution card becoming a migration destination to the network device 100-1 or 100-2.

Figure 2:
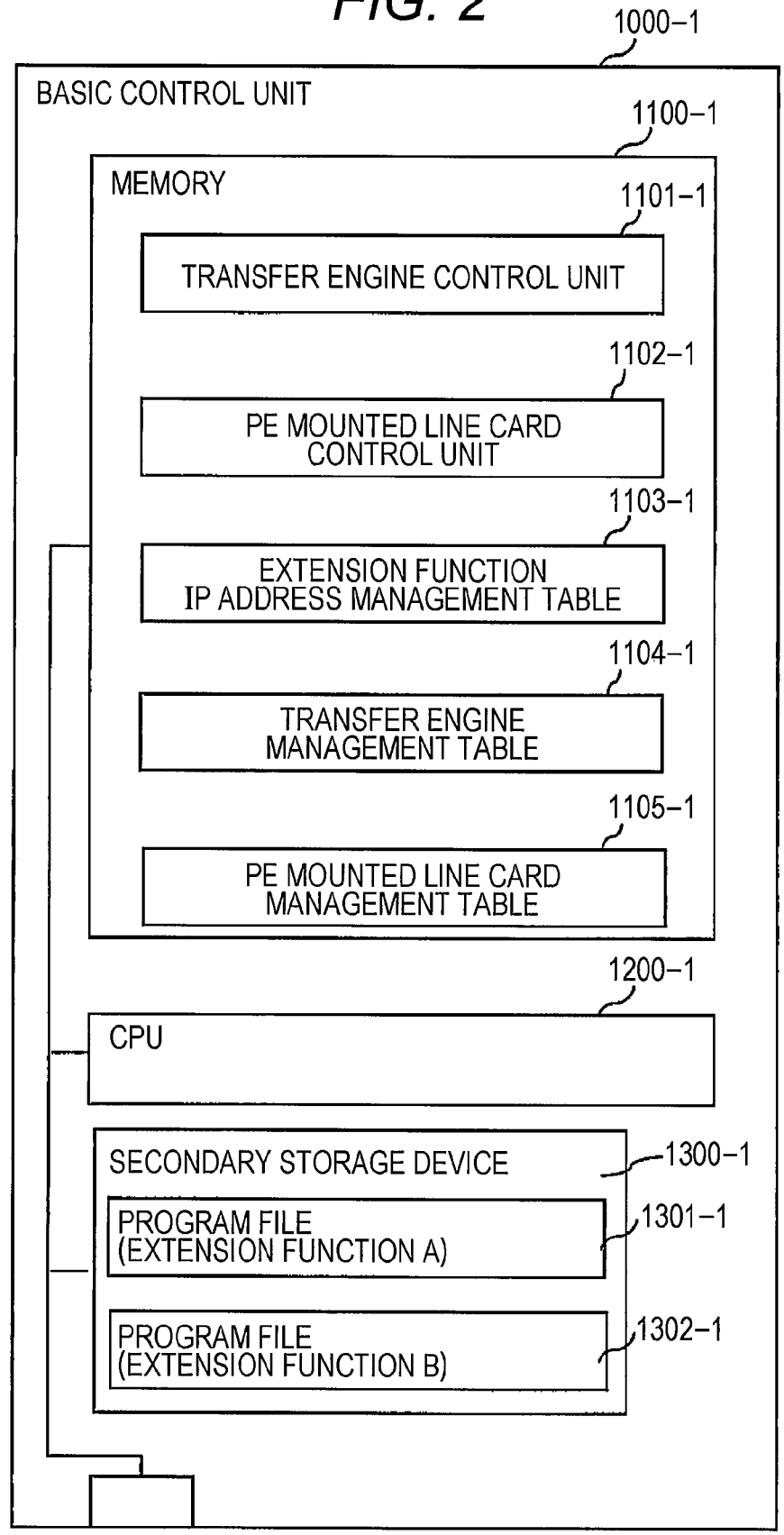
FIG. 2 is a diagram illustrating a basic control unit according to the first embodiment.

FIG. 2 is a diagram illustrating the basic control unit 1000-1 according to the first embodiment.

The basic control unit 1000-1 has a CPU 1200-1, a memory 1100-1, and a secondary storage device 1300-1. The memory 1100-1 stores a program corresponding to a transfer engine control unit 1101-1, a program corresponding to a PE mounted line card control unit 1102-1, an extension function IP address management table 1103-1, a transfer engine management table 1104-1, and a PE mounted line card management table 1105-1. In the first and second embodiments, the PE mounted line card control unit 1102-1 and the PE mounted line card management table 1105-1 are not essential elements.

The CPU 1200-1 executes the program corresponding to the transfer engine control unit 1101-1 stored in the memory 1100-1 to mount the transfer engine control unit 1101-1 and executes the program corresponding to the PE mounted line card control unit 1102-1 stored in the memory 1100-1 to mount the PE mounted line card control unit 1102-1.

The secondary storage device 1300-1 stores program files 1301-1 and 1302-1 of extension functions mounted on a function execution card. The program file 1301 is used to start the DP started by the function execution card 3000-2 of the migration destination.

The transfer engine control unit 1101-1 controls the transfer engine 2000-1. For example, the transfer engine control unit 1101-1 updates the transfer table 2100-1. The PE mounted line card control unit 1102-1 controls the PE mounted line card 4000-1.

An association of identification information of extension functions mounted on the function execution cards 3000-1 and 3000-2 included in the network device 100-1 having the basic control unit 1000-1 and IP addresses set to the extension functions is registered in the extension function IP address management table 1103-1. The extension function IP address management table 1103-1 will be described in detail with reference to FIG. 5.

An association of the function execution cards 3000-1 to 3000-3, IP addresses of the function execution cards 3000-1 to 3000-3, and identification information of ports of output destinations is registered in the transfer engine management table 1104-1. The transfer engine management table 1104-1 will be described in detail with reference to FIG. 6.

An association of identification information of the PE mounted line card 4000-1 and identification information of a type of a function of the microcode 4210-1 of the PE mounted line card 4000-1 is registered in the PE mounted line card management table 1105-1. The PE mounted line card management table 1105-1 will be described in detail with reference to FIG. 7.

Because the basic control unit 1000-2 included in the network device 100-2 has the same configuration as that of FIG. 2, description thereof is omitted.

Figure 3:
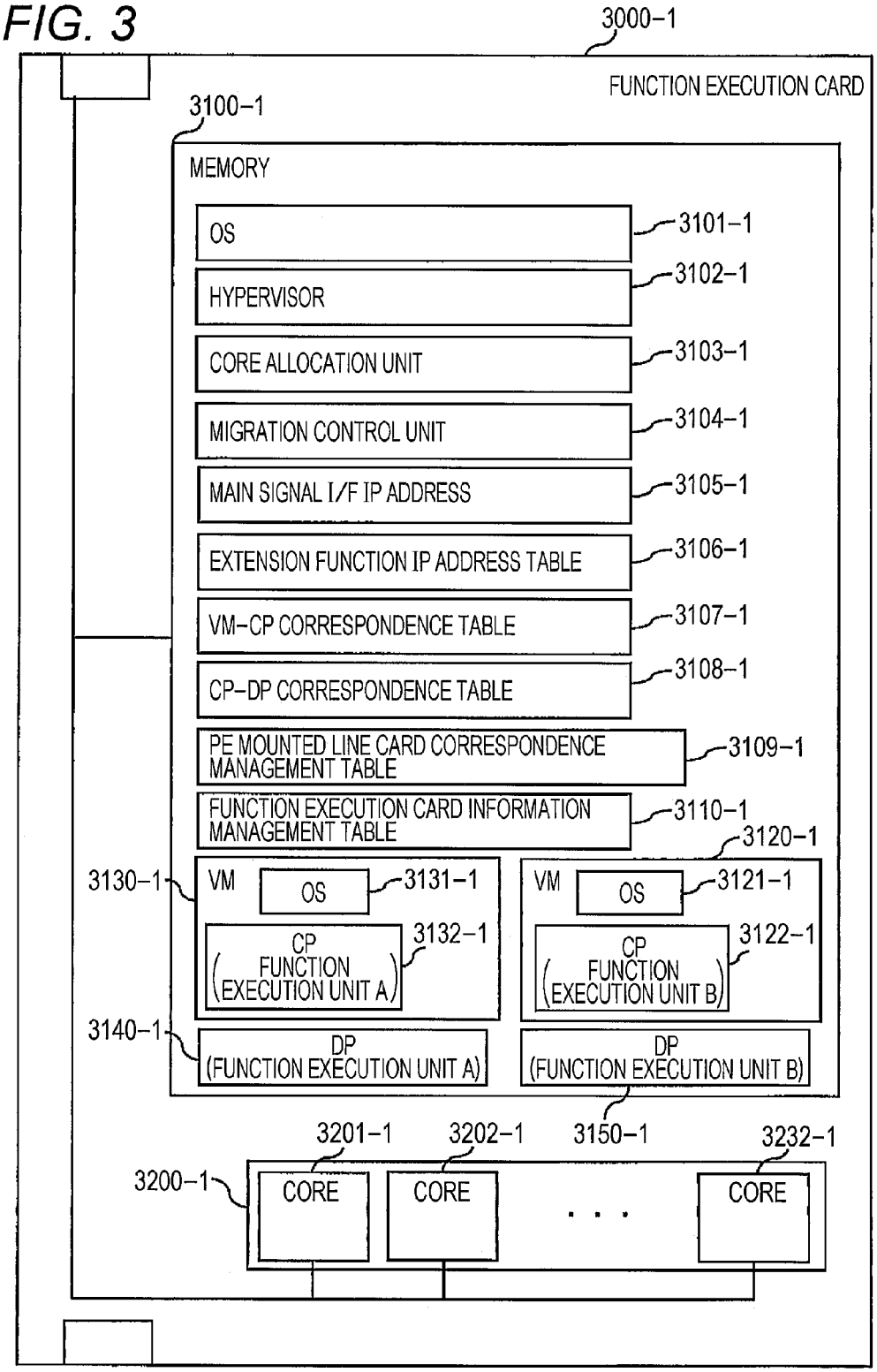
FIG. 3 is a diagram illustrating a function execution card according to the first embodiment.

FIG. 3 is a diagram illustrating the function execution card 3000-1 according to the first embodiment.

The function execution card 3000-1 has a physical processor 3200-1 and a memory 3100-1. The physical processor 3200-1 has a plurality of processor cores. In FIG. 3, the physical processor 3200-1 has 32 processor cores 3201-1 to 3232-1.

The memory 3100-1 stores programs corresponding to an OS 3101-1, a hypervisor 3102-1, a core allocation unit 3103-1, and a migration control unit 3104-1. The physical processor 3200-1 executes these programs to mount the OS 3101-1, the hypervisor 3102-1, the core allocation unit 3103-1, and the migration control unit 3104-1.

The OS 3101-1 performs basic control of the function execution card 3000-1. The hypervisor 3102-1 controls the virtual machines (VMs) 3130-1 and 3120-1 mounted on the memory 3100-1.

The core allocation unit 3103-1 controls allocation of the processor cores to the DP. The migration control unit 3104-1 controls migration of the extension function mounted on the function execution card 3000-1.

The VMs 3120-1 and 3130-1 are constructed on the function execution card 3000-1. The OS 3131-1 operated by the VM 3130-1 provides the CP 3132-1 and an OS 3121-1 operated by the VM 3120-1 provides a CP 3122-1. In addition, the DPs 3140-1 and 3150-1 to relay a packet are operated on the function execution card 3000-1. The extension function A is realized by the CP 3132-1 and the DP 3140-1 and the extension function B is realized by the CP 3122-1 and the DP 3150-1.

In addition, the memory 3100-1 stores a main signal I/F IP address 3105-1, an extension function IP address table 3106-1, a VM-CP correspondence table 3107-1, a CP-DP correspondence table 3108-1, a PE mounted line card correspondence management table 3109-1, and a function execution card information management table 3110-1.

The main signal I/F IP address 3105-1 is an IP address set to a port of the transfer engine 2000-1 to which the function execution card 3000-1 is connected, that is, an IP address of the function execution card 3000-1. An association of identification information of an extension function mounted on the function execution card 3000-1 and an IP address set to the extension function is registered in the extension function IP address table 3106-1. The extension function IP address table 3106-1 will be described in detail with reference to FIG. 13.

An association of identification information of a VM constructed on the function execution card 3000-1 and identification information of a CP operated on the VM and information regarding allocation of the physical processor 3200-1 of the CP are registered in the VM-CP correspondence table 3107-1. The VM-CP correspondence table 3107-1 will be described in detail with reference to FIG. 9.

An association of identification information of a CP to be a function execution unit to realize one extension function and identification information of a DP and information regarding allocation of the physical processor 3200-1 of the DP are registered in the CP-DP correspondence table 3108-1. The CP-DP correspondence table 3108-1 will be described in detail with reference to FIG. 10.

An association of a function of a microcode of the PE mounted line card 4000-1 and an extension function is registered in the PE mounted line card correspondence management table 3109-1. The PE mounted line card correspondence management table 3109-1 will be described in detail with reference to FIG. 11.

An association of identification information of all of the function execution cards 3000-1 to 3000-3 and IP addresses of the function execution cards 3000-1 to 3000-3 is registered in the function execution card information management table 3110-1. The function execution card information management table 3110-1 will be described in detail with reference to FIG. 12.

The function execution card 3000-2 and the function execution card 3000-3 are different from the function execution card 3000-1 in that the VM is not constructed and the extension function is not operated.

FIG. 4 is a diagram illustrating the PE mounted line card 4000-1 according to the first embodiment.

The PE mounted line card 4000-1 has a memory 4100-1 and a PE 4200-1. The PE 4200-1 executes a process of the microcode 4210-1. The microcode 4210-1 has a function of transferring a packet received by a port of the PE mounted line card 4000-1 to the function execution cards 3000-1 to 3000-3. The memory 4100-1 stores an extension function IP address table 4102-1 and a function type management table 4103. An association of identification information of an extension function operated by the network device 100-1 and an IP address of the extension function is registered in the extension function IP address table 4102-1. Identification information of a type of a function of the microcode 4210-1 executed by the PE 4200-1 is registered in the function type management table 4103.

The PE mounted line card 4000-2 has the same configuration as that of the PE mounted line card 4000-1. However, a microcode is not stored in the PE.

FIG. 5 is a diagram illustrating the extension function IP address management table 1103-1 according to the first embodiment.

The extension function IP address management table 1103-1 includes an extension function ID 11031 and an IP address 11032. Identification information (extension function IDs) of extension functions mounted on the function execution cards 3000-1 and 3000-2 included in the network device 100-1 having the basic control unit 1000-1 are registered in the extension function ID 11031. An IP address set to the extension function is registered in the IP address 11032.

That is, an association of the extension function ID and the IP address of the extension function is registered in the extension function IP address management table 1103-1.

Figure 6:
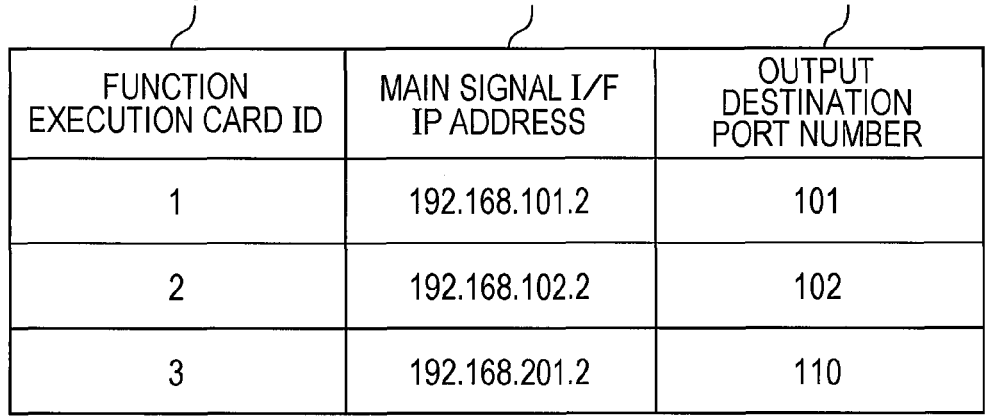
FIG. 6 is a diagram illustrating a transfer engine management table according to the first embodiment.

FIG. 6 is a diagram illustrating the transfer engine management table 1104-1 according to the first embodiment.

The transfer engine management table 1104-1 includes a function execution card ID 11041, a main signal I/F IP address 11042, and an output destination port number 11043.

Identification information (function execution card IDs) of the function execution cards 3000-1 to 3000-3 of both the network devices 100-1 and 100-2 are registered in the function execution card ID 11041.

An IP address (an IP address of the function execution card) set to the port connected to the function execution cards 3000-1 to 3000-3 in the ports of the transfer engines 2000-1 and 2000-2 is registered in the main signal I/F IP address 11042.

Identification information (a port number) of the port connected to the function execution cards 3000-1 to 3000-3 in the ports of the transfer engines 2000-1 and 2000-2 is registered in the output destination port number 11043.

That is, an association of an IP address of a function execution card and a number of a port to output a packet to the function execution card is registered in the transfer engine management table 1104-1.

Figure 7:
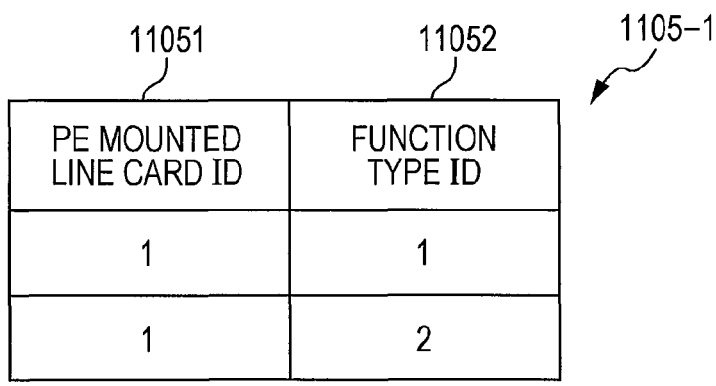
FIG. 7 is a diagram illustrating a PE mounted line card management table according to the first embodiment.

FIG. 7 is a diagram illustrating the PE mounted line card management table 1105-1 according to the first embodiment.

The PE mounted line card management table 1105-1 includes a PE mounted line card ID 11051 and a function type ID 11052.

Identification information (PE mounted line card IDs) of PE mounted line cards included in the network device 100-1 are registered in the PE mounted line card ID 11051. Identification information (a function type ID) of a type of a function of a microcode of the PE mounted line card is registered in the function type ID 11052.

That is, an association of the PE mounted line card ID and the function type ID is registered in the PE mounted line card management table 1105-1.

Figure 8:
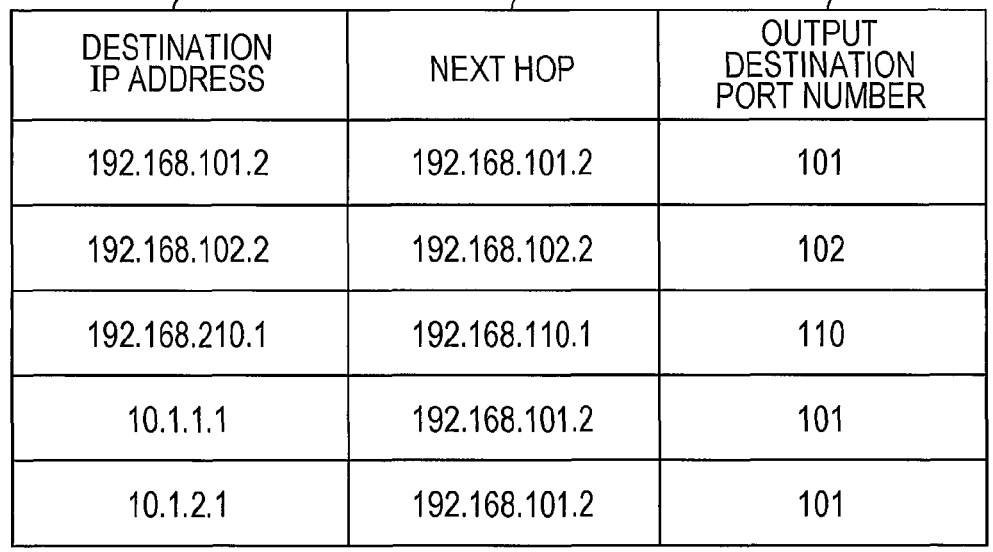
FIG. 8 is a diagram illustrating a transfer table according to the first embodiment.

FIG. 8 is a diagram illustrating the transfer table 2100-1 according to the first embodiment.

A destination IP address 21001, a next hop 21002, and an output destination port number 21003 are registered in the transfer table 2100-1.

An IP address (a destination IP address) of a destination of a packet is registered in the destination IP address 21001. An IP address of a next hop is registered in the next hop 21002. A number of a port to output a packet is registered in the output destination port number 21003.

That is, a destination of a packet and an output destination of the packet are registered in the transfer table 2100-1.

Figure 9:
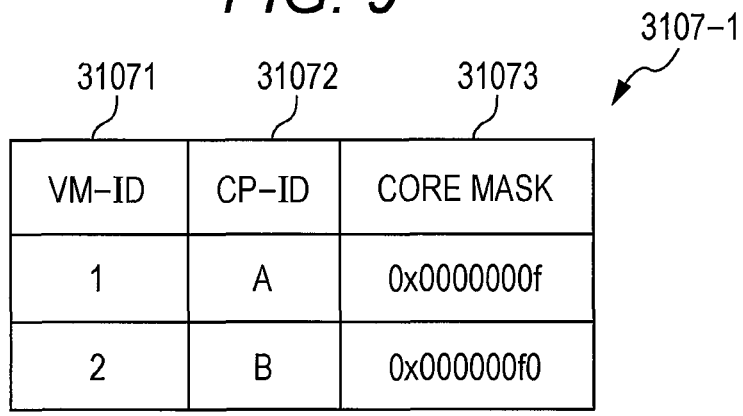
FIG. 9 is a diagram illustrating a VM-CP correspondence table according to the first embodiment.

FIG. 9 is a diagram illustrating the VM-CP correspondence table 3107-1 according to the first embodiment.

The VM-CP correspondence table 3107-1 includes a VM-ID 31071, a CP-ID 31072, and a CORE mask 31073.

Identification information (VM-ID) of a virtual machine constructed on a function execution card is registered in the VM-ID 31071. Identification information (CP-ID) of a CP provided by an OS operated on the virtual machine is registered in the CP-ID 31072. Information to specify, cores allocated to a CP among cores of the physical processor 3200-1 is registered in the CORE mask 31073. The cores allocated to the CP among 32 processor cores 3201-1 to 3232-1 of the physical processor 3200-1 can be specified by 8 hexadecimal digits registered in the CORE mask 31073. For example, because "0x0000000f" is registered in the CORE mask 31073 of a CP-ID "1", four cores 3229-1 (not illustrated in FIG. 3) to 3232-1 of the physical processor 3200-1 are allocated to a CP of the CP-ID "1". The CORE mask 31073 is information regarding allocation of the physical processor 3200-1 of the CP and may have a different format, as long as the number of cores allocated to the CP is included.

That is, an association of identification information of a VM constructed on the function execution card 3000-1 and identification information of a CP operated on the VM and information regarding allocation of the physical processor 3200-1 of the CP are registered in the VM-CP correspondence table 3107-1.

Because a virtual machine is not constructed on the function execution card 3000-2, there is no information registered in a VM-CP correspondence table of the function execution card 3000-2.

Figure 10:
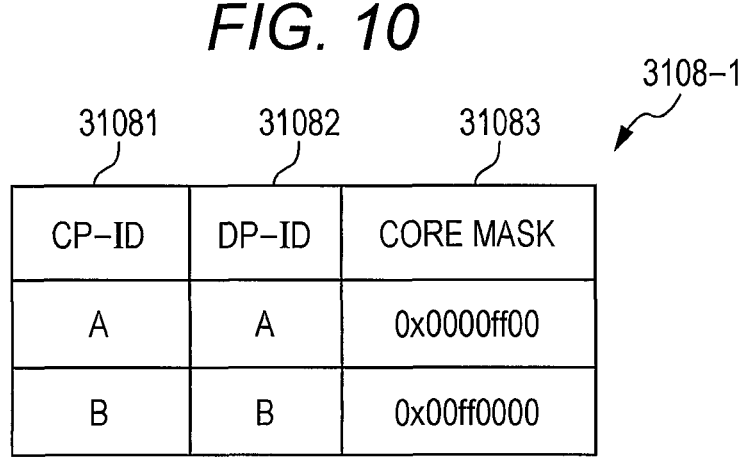
FIG. 10 is a diagram illustrating a CP-DP correspondence table according to the first embodiment.

FIG. 10 is a diagram illustrating the CP-DP correspondence table 3108-1 according to the first embodiment.

The CP-DP correspondence table 3108-1 includes a CP-ID 31081, a DP-ID 31082, and a CORE mask 31083.

Identification information (CP-ID) of a CP operated on the function execution card 3000-1 is registered in the CP-ID 31081. Identification information (DP-ID) of a DP that mounts an extension function in cooperation with the CP is registered in the DP-ID 31082. Information to specify cores allocated to the DP among the cores of the physical processor 3200-1 is registered in the CORE mask 31083. Because the CORE mask 31083 has the same configuration as that of the CORE mask 31073, description thereof is omitted.

That is, an association of identification information of a CP to realize one extension function and identification information of a DP and information regarding allocation of the physical processor 3200-1 of the DP are registered in the CP-DP correspondence table 3108-1.

Because the DP is not operated on the function execution card 3000-2, there is no information registered in a CP-DP correspondence table of the function execution card 3000-2.

Figure 11:
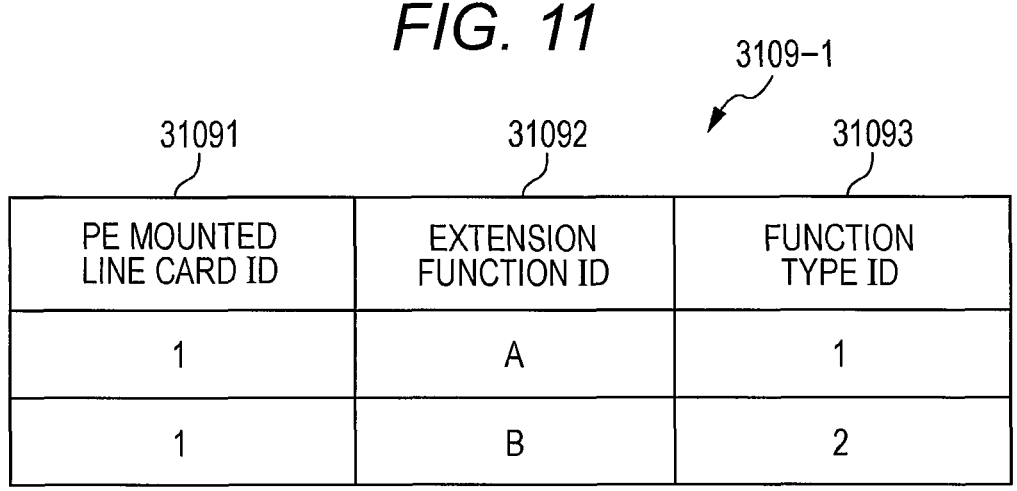
FIG. 11 is a diagram illustrating a PE mounted line card correspondence management table according to the first embodiment.

FIG. 11 is a diagram illustrating the PE mounted line card correspondence management table 3109-1 according to the first embodiment.

A PE mounted line card ID is registered in the PE mounted line card ID 31091, identification information (extension function ID) of an extension function mounted on the function execution card 3000-1 is registered in the extension function ID 31092, and identification information (function type ID) of a type of a function of a microcode corresponding to an extension function is registered in the function type ID 31093.

That is, an association of a function of a microcode of the PE mounted line card 4000-1 and an extension function is registered in the PE mounted line card correspondence management table 3109-1.

FIG. 12 is a diagram illustrating the function execution card information management table 3110-1 according to the first embodiment.

The function execution card information management table 3110-1 includes a function execution card ID 31101 and an IP address 31102.

Identification information (function execution card IDs) of all of function execution cards of the network relay system are registered in the function execution card ID 31101 and IP addresses of the function execution cards are registered in the IP address 31102.

That is, an association of identification information of all of the function execution cards 3000-1 to 3000-3 and IP addresses of the function execution cards 3000-1 to 3000-3 is registered.

FIG. 13 is a diagram illustrating the extension function IP address table 3106-1 according to the first embodiment.

The extension function IP address table 3106-1 includes an extension function ID 31061 and an IP address 31062.

Identification information (extension function ID) of an extension function mounted on the function execution card 3000-1 is registered in the extension function ID 31061 and an IP address of the extension function is registered in the IP address 31062.

That is, an association of identification information of an extension function mounted on the function execution card 3000-1 and an IP address set to the extension function is registered in the extension function IP address table 3106-1.

Figure 14:
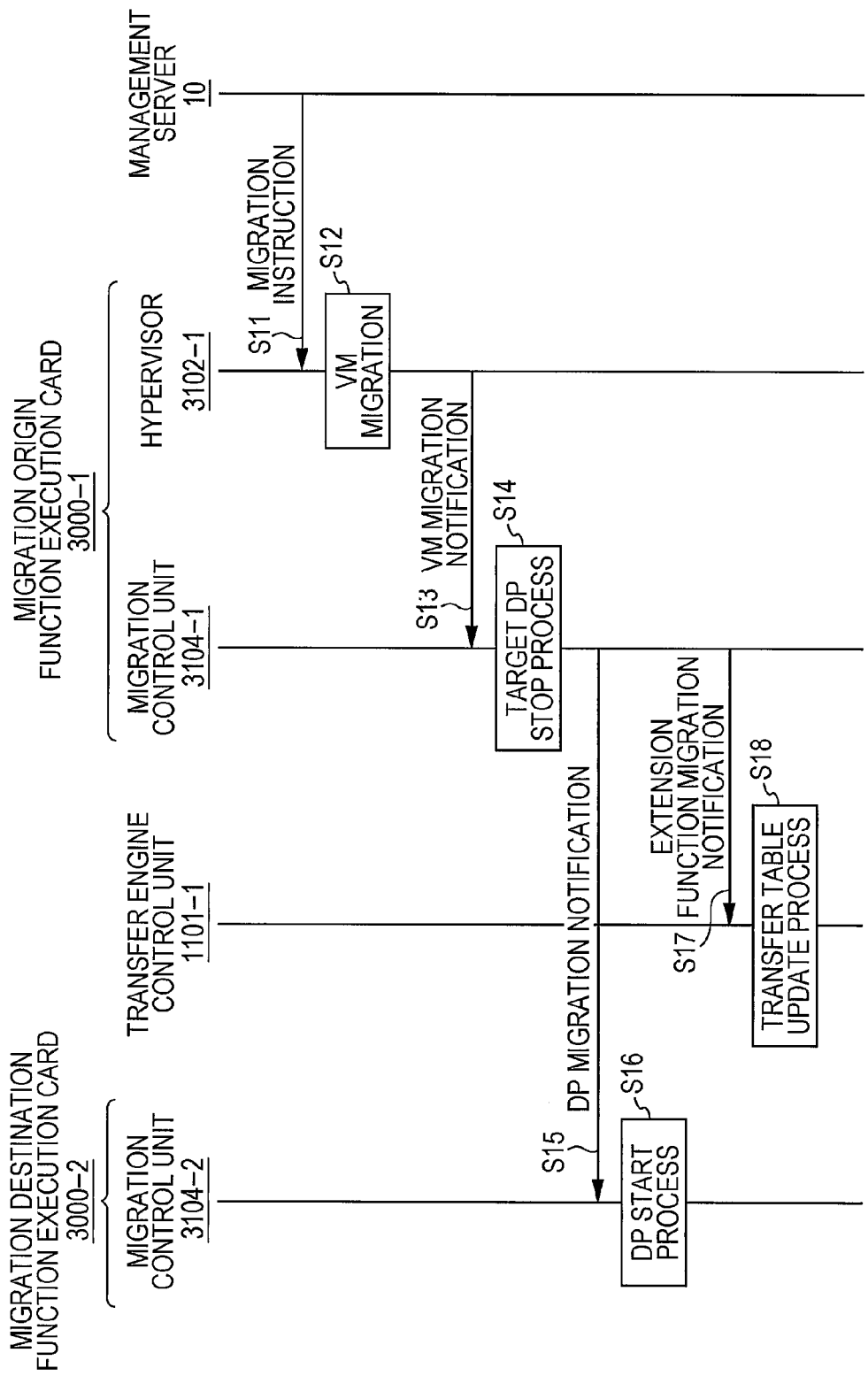
FIG. 14 is a sequence diagram when a virtual machine constructed on a function execution card is migrated to other function execution card in accordance with the first embodiment.

FIG. 14 is a sequence diagram when a virtual machine constructed on a function execution card is migrated to other function execution card in accordance with the first embodiment.

The network device 100-1 has the function execution cards 3000-1 and 3000-2. As described in FIG. 3, the VMs 3120-1 and 3130-1 are constructed on the function execution card 3000-1 and the CPs 3132-1 and 3122-1 and the DPs 3140-1 and 3150-1 are operated. The extension function A is mounted by the CP 3132-1 and the DP 3140-1 and the extension function B is mounted by the CP 3122-1 and the DP 3150-1.

In addition, the VM is not constructed on the function execution card 3000-2 and the CP and the DP are not operated.

In this embodiment, an operation for migrating the extension function A mounted on the function execution card 3000-1 to the function execution card 3000-2 will be described.

First, the migration instruction unit 13 of the management server 10 transmits a migration instruction including an extension function ID "A" of a migration target and a function execution card ID "2" of a migration destination to the network device 100-1 (S11). The migration instruction unit 13 may transmit the migration instruction when an input of the extension function ID of the migration target and the function execution card ID of the migration destination by a manager is received or may collect loads of the function execution cards, specify the extension function ID of the migration target and the function execution card ID of the migration destination on the basis of the collected loads, and transmit the migration instruction.

If the network device 100-1 receives the migration instruction and the received migration instruction is input to the function execution card 3000-1, the hypervisor 3102-1 of the function execution card 3000-1 executes a VM migration process (S12) and outputs a VM migration notification to the migration control unit 3104-1 (S13). Specifically, in the VM migration process, the hypervisor 3102-1 migrates the VM 3130-1 operated by the OS 3131-1 providing the CP 3132-1 of the extension function A to the function execution card 3000-2 of the migration destination, on the basis of the input migration instruction. In addition, the VM migration notification includes an extension function ID of a migration target, identification information (VM-ID) of a migrated virtual machine, and a function execution card ID of a migration destination.

If the VM migration notification is input, the migration control unit 3104-1 executes a target DP stop process (S14), outputs a DP migration notification to the function execution card 3000-2 of the migration destination (S15), and outputs an extension function migration notification to the transfer engine control unit 1101-1 (S17).

In the target DP stop process, the migration control unit 3104-1 specifies a DP-ID on the basis of the VM-ID included in the input VM migration notification and stops a function of a DP identified by the DP-ID. In addition, the migration control unit 3104-1 acquires DP information including the specified DP-ID and a CORE mask of the DP and outputs the DP migration notification. In addition, the migration control unit 3104-1 outputs an extension function migration notification including the extension function ID of the migration target and the function execution card ID of the migration destination to the transfer engine control unit 1101-1. The target DP stop process will be described in detail with reference to FIG. 15.

If a DP migration instruction is input to the function execution card 3000-2 of the migration destination, the migration control unit 3104-2 of the function execution card 3000-2 executes a DP start process for starting the DP on the basis of the DP migration instruction (S16). The DP start process will be described in detail with reference to FIG. 16.

If an extension function migration notification is input to the transfer engine control unit 1101-1, the transfer engine control unit 1101-1 executes a transfer table update process for updating the transfer table 2100-1, such that a packet to the extension function of the migration target is output to the function execution card 3000-2 of the migration destination (S17). The transfer table update process will be described in detail with reference to FIG. 17.

Figure 15:
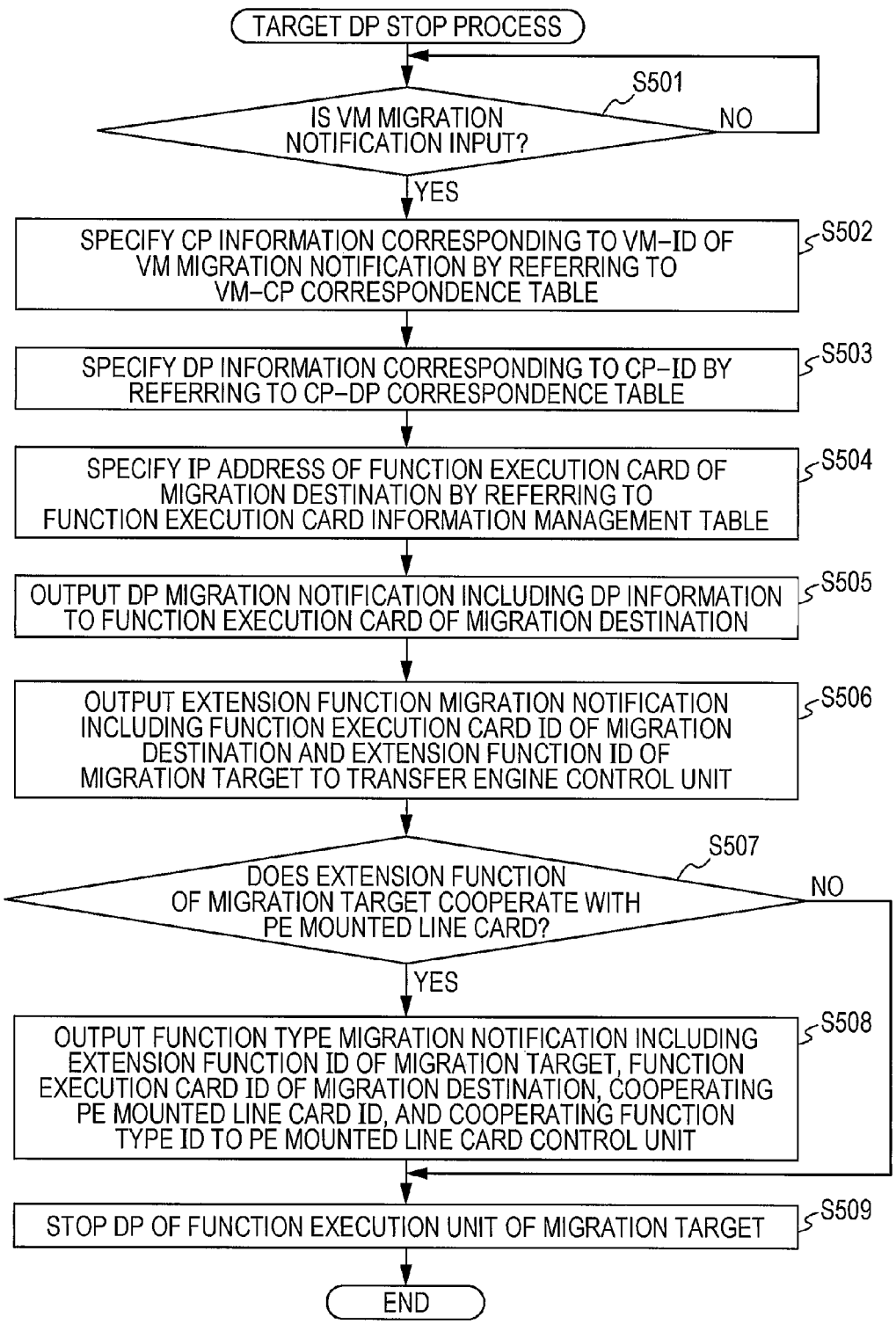
FIG. 15 is a flowchart of a target DP stop process according to the first embodiment.

FIG. 15 is a flowchart of the target. DP stop process according to the first embodiment.

The migration control unit 3104-1 determines whether the VM migration notification is input (S501). In the VM migration notification, an extension function ID "A" of a migration target, a migrated VM-ID "1", and a function execution card ID "2" of a migration destination are included.

When it is determined in S501 that the VM migration notification is not input, the migration control unit 3104-1 returns to S501 and redetermines whether the VM migration notification is input.

When it is determined in S501 that the VM migration notification is input, the migration control unit 3104-1 specifies the CP-ID corresponding to the migrated VM-ID included in the input VM migration notification, by referring to the association of the VM-ID and the CP-ID, and specifies information regarding allocation of the physical processor 3200-1 of the CP, on the basis of the CP-ID (S502). The specified CP-ID and the information regarding the allocation of the physical processor 3200-1 of the CP are called CP information.

Specifically, the migration control unit 3104-1 specifies a CP-ID "A" and a CORE mask "0x0000000f" of a record in which the VM-ID "1" included in the input VM migration notification is registered in the VM-ID 31071 of the VM-CP correspondence table 3107-1. Here, the specified CP-ID "A" is identification information of the CP 3132-1 migrated to the function execution card 3000-2 of the migration destination by the VM migration by the hypervisor.

Next, the migration control unit 3104-1 specifies the DP-ID corresponding to the CP-ID "A" of the CP 3132-1 migrated to the function execution card 3000-2 of the migration destination, by referring to the association of the CP-ID and the DP-ID, and specifies the information regarding the allocation of the physical processor 3200-1 of the DP, on the basis of the DP-ID (S503). The specified DP-ID and the information regarding the allocation of the physical processor 3200-1 of the DP are called DP information. Here, the DP-ID of the DP cooperating with the CP 3132-1 is specified to mount the same extension function A with the migrated CP 3132-1 and the information regarding the allocation of the physical processor 3200-1 of the DP is executed.

Specifically, the migration control unit 3104-1 specifies a DP-ID "A" and a CORE mask "0x0000ff00" of a record in which the CP-ID "A" specified by S502 is registered in the CP-ID 31081 of the CP-DP correspondence table 3108-1.

Next, the migration control unit 3104-1 specifies the IP address of the function execution card 3000-2 of the migration destination, by referring to the association of the function execution card ID and the IP address of the function execution card (S504).

Specifically, the migration control unit 3104-1 specifies an IP address "192.168.102.2" of a record in which the function execution card ID "2" of the migration destination included in the input VM migration notification is registered in the function execution card ID 31101 of the function execution card information management table 3110-1.

Next, the migration control unit 3104-1 outputs the DP migration notification including the DP information specified by S503 to the IP address of the function execution card 3000-2 of the migration destination specified by S504 (S505).

Next, the migration control unit 3104-1 outputs the function execution unit migration notification including the function execution card ID "2" of the migration destination and the extension function ID "A" of the migration target included in the input VM migration notification to the transfer engine control unit 1101-1 (S506).

Next, the migration control unit 3104-1 determines whether the PE mounted line card cooperating with the extension function of the migration target exists, by referring to the association of the extension function ID of the migration target and the PE mounted line card ID (S507).

When it is determined in S507 that the PE mounted line card cooperating with the extension function of the migration target exists, the migration control unit 3104-1 executes S508 and proceeds to S509. Meanwhile, when it is determined in S507 that the PE mounted line card cooperating with the extension function of the migration target does not exist, the migration control unit 3104-1 proceeds to S509. In this embodiment, because the PE mounted line card is not considered, it is determined in S507 that the PE mounted line card cooperating with the extension function of the migration target does not exist and the migration control unit 3104-1 does not execute S508 and proceeds to S509. S507 and S508 will be described in detail in a third embodiment.

In S509, the migration control unit 3104-1 stops the function of the DP 3140-1 of the DP-ID "A" specified by S503 (S509) and ends the process. Before or after execution of S509, the migration control unit 3104-1 deletes a record in which the DP-ID "A" is registered in the DP-ID 31082 of the CP-DP correspondence table 3108-1.

Figure 16:
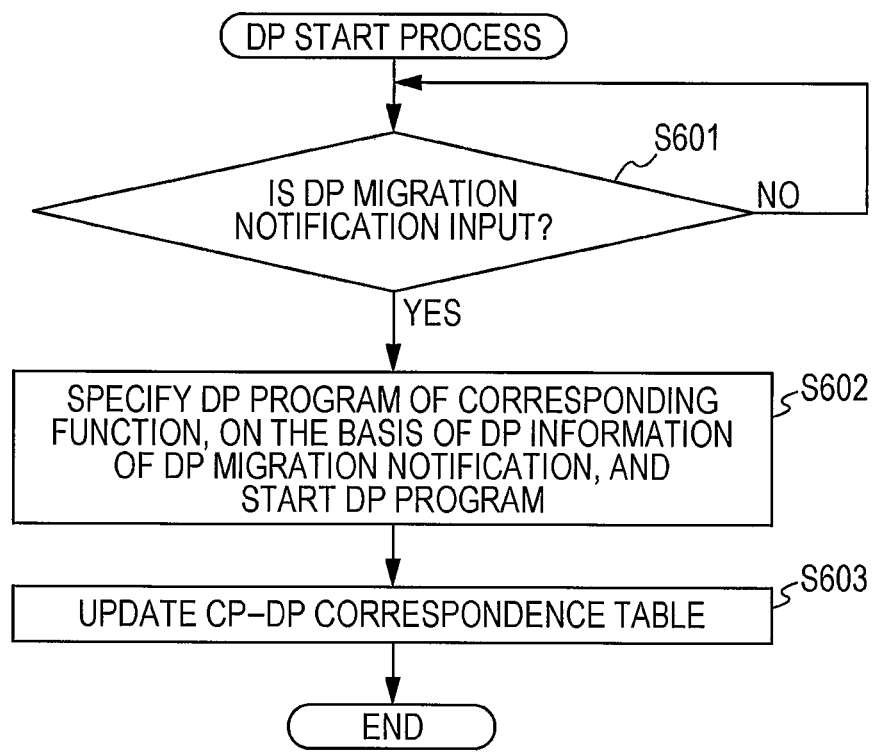
FIG. 16 is a flowchart of a DP start process according to the first embodiment.

FIG. 16 is a flowchart of the DP start process according to the first embodiment.

First, the migration control unit 3104-2 of the function execution card 3000-2 of the migration destination determines whether the DP migration notification is input (S601). The DP migration notification includes the DP information (the DP-ID "A" and the CORE mask "0x0000ff00").

When it is determined in S601 that the DP migration notification is not input, the migration control unit 3104-2 returns to S601 and redetermines whether the DP migration notification is input.

When it is determined in S601 that the DP migration notification is input, the migration control unit 3104-2 starts the DP on the basis of the DP information included in the input DP migration notification (S602).

Specifically, the migration control unit 3104-2 downloads the program file 1301-1 corresponding to the DP-ID "A" included in the DP migration notification from the basic control unit 1000-1 to the memory of the function execution card 3000-2. In addition, the migration control unit 3104-2 delivers the CORE mask "0x0000ff00" included in the DP migration notification to the core allocation unit of the function execution card 3000-2. The core allocation unit allocates the processor cores of the physical processor of the function execution card 3000-2 to the DP, on the basis of the CORE mask "0x0000ff00". Thereby, in the function execution card 3000-2 of the migration destination, the processor cores of the physical processor can be allocated to the DP, similar to when the DP is operated by the function execution card 3000-1. In other words, processor cores of the same number as the number of processor cores allocated to the DP in the function execution card 3000-1 of the migration origin can be allocated to the DP in the function execution card 3000-2 of the migration destination and the processing ability of the DP can be prevented from increasing or decreasing before and after the migration of the DP. The core allocation unit according to this embodiment is operated independently from the hypervisor of the function execution card. However, the hypervisor may have the function of the core allocation unit.

Figure 21:
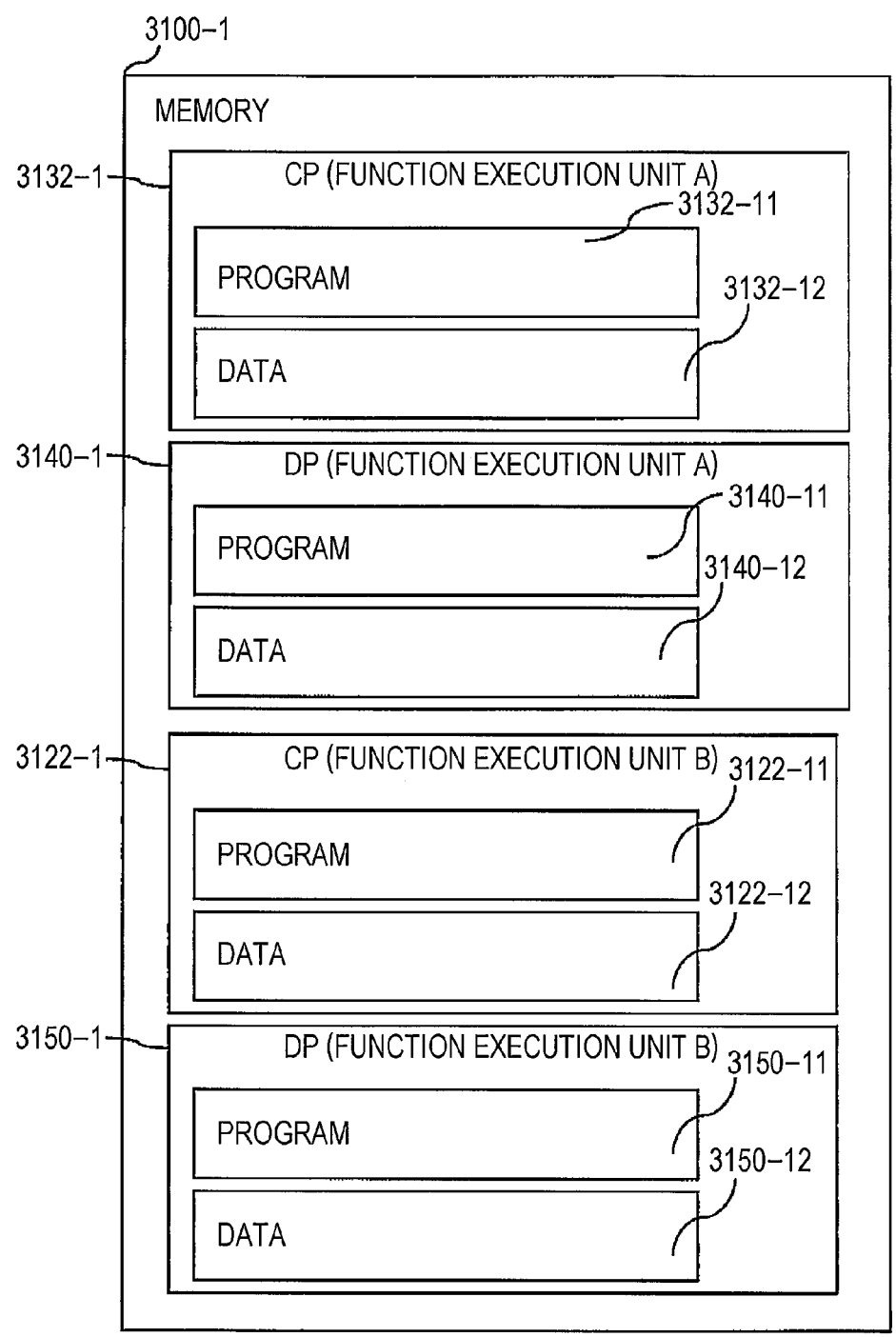
FIG. 21 is a diagram illustrating a memory arrangement of a function execution unit in a function execution card according to the first embodiment.

FIG. 21 illustrates a memory structure of the CP 3132-1 and the DP 3140-1 of the extension function A and the CP 3122-1 and the DP 3150-1 of the extension function B in the memory 3100-1 mounted on the function execution card 3000-1. The CP 3132-1 of the extension function A to be the migration target is configured from data 3132-12 set by control communication of a program 3132-11 and the server. The CP 3132-1 and the DP 3140-1 share the data 3132-12 in the memory 3100-1 and execute the extension function A. The CP migrated by the hypervisor 3102-1 in the process of the VM migration notification is configured from the program 3132-11 and the data 3132-12 equal to the program and the data operated by the function execution card 3000-1 before the migration and can be operated.

Meanwhile, the DP 3140-1 of the extension function A is configured from a program 3140-11 and data 3140-12, similar to the CP, and data transferred at the present time is temporarily stored in the data 3140-12. The DP started by the function execution card 3000-2 of the migration destination in the process of the DP migration notification is started from the program file 1301-1 of the corresponding extension function A stored in the basic control unit 1000-1 and is downloaded. Therefore, a process subject of the extension function including the CP and the DP is changed by the migration according to this embodiment.

The data 3140-12 operated by the function execution card 3000-1 before the migration may be migrated according to the download of the program file 1301-1. In addition, the data transferred at the present time is temporarily stored in the data 3140-12. For this reason, if loss is allowed for the packet on which the transfer process is executed when a process part of the extension function is migrated, entire data necessary for an operation of the extension function A is managed in the data 3132-12 of the CP 3132-1 and thus, the following transfer process may be taken over by the migration destination without using the data 3140-12. In addition, it may be detected when the packet during the transfer process is not held in the memory 3100 and the migration of the CP and the DP regarding the extension function may be performed.

Thereby, the CP of the CP-ID "A" and the DP of the DP-ID "A" are operated on the function execution card 3000-2 and the extension function A is mounted on the function execution card 3000-2.

Next, the migration control unit 3104-2 updates the CP-DP correspondence table of the function execution card 3000-2 by an association of a CP-ID of a newly operated CP 3000-2 and a DP-ID of a DP and information regarding allocation of a physical processor of the DP (S603) and ends the process.

Specifically, the migration control unit 3104-2 adds a new record to the CP-DP correspondence table, registers the CP-ID "A" in the CP-ID 31081, registers the DP-ID "A" in the DP-ID 31082, and registers the "CORE mask 0x0000ff00" in the CORE mask 31083.

Figure 17:
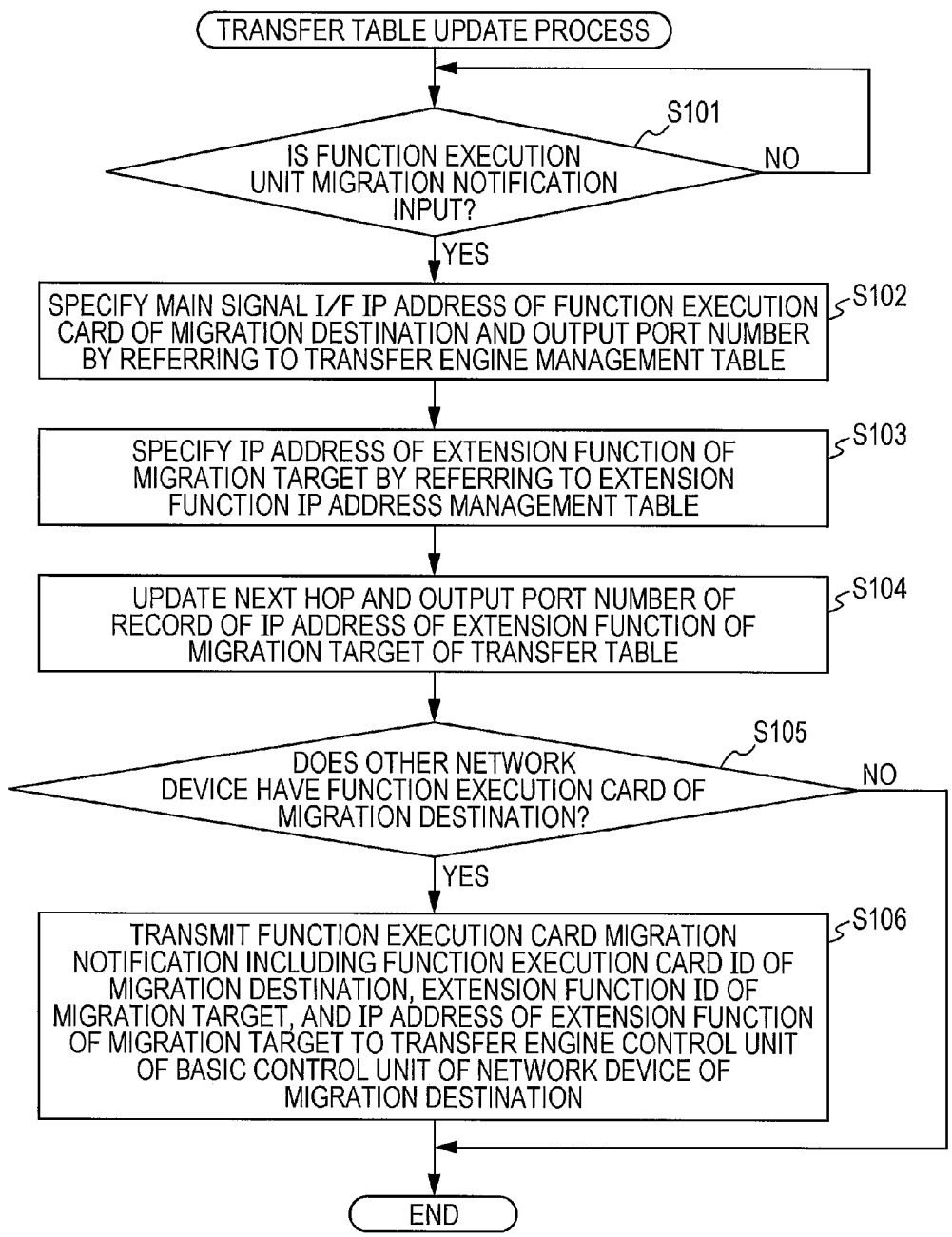
FIG. 17 is a flowchart of a transfer table update process according to the first embodiment.

FIG. 17 is a flowchart of the transfer table update process according to the first embodiment.

First, the transfer engine control unit 1101-1 determines whether the extension function migration notification is input (S101). The extension function migration notification includes the function execution card ID "2" of the migration destination and the extension function ID "A" of the migration target.

When it is determined in S101 that the extension function migration notification is not input, the transfer engine control unit 1101-1 returns to S101 and redetermines whether the extension function migration notification is input.

When it is determined in S101 that the extension function migration notification is input, the transfer engine control unit 1101-1 specifies the IP address of the function execution card of the function execution card ID of the migration destination included in the extension function migration notification and the port number of the output destination, by referring to the association of the function execution card ID, the IP address of the function execution card, and the port number of the output destination (S102).

Specifically, the transfer engine control unit 1101-1 specifies a main signal I/F IP address "192.168.102.2" and an output destination port number "102" of a record in which the function execution card ID "2" of the migration destination is registered in the function execution card ID 11041 of the transfer engine management table 1104-1.

Next, the transfer engine control unit 1101-1 specifies an IP address of an extension function identified by the extension function ID of the migration target included in the input extension function migration notification, by referring to the association of the extension function ID and the IP address of the extension function (S103).

Specifically, the transfer engine control unit 1101-1 specifies an IP address "10.1.1.1" of a record in which the extension function ID "A" of the migration target is registered in the extension function ID 11031 of the extension function IP address management table 1103-1.

Next, the transfer engine control unit 1101-1 updates the transfer table 2100-1 such that an output destination of a packet to the IP address of the extension function of the migration target becomes the function execution card 3000-2 of the migration destination (S104).

Specifically, the transfer engine control unit 1101-1 registers the main signal I/F IP address "192.168.102.2" specified by S102 in the next hop 21002 of the record in which the IP address "10.1.1.1" of the extension function of the migration target specified by S103 is registered in the destination IP address 21001 of the transfer table 2100-1 and registers the output destination port number "102" specified by S102 in the output destination port number 21003 of the record. Thereby, the network device 100-1 can transmit a packet to the extension function becoming the migration target to the function execution card 3000-2 of the migration destination.

Next, the transfer engine control unit 1101-1 determines whether other network device has a function execution card of the migration destination (S105). Each of the basic control units 1000-1 and 1000-2 has a table (not illustrated in the drawings) to manage the function execution card ID of the self network device. In S105, the transfer engine control unit 1101-1 determines whether the function execution card ID of the migration destination included in the input extension function migration notification is registered in the table, thereby determining whether other network device has the function execution card of the migration destination.

When it is determined in S105 that other network device has the function execution card of the migration destination, the transfer engine control unit 1101-1 executes S106 and ends the process. When it is determined in S105 that other network device does not have the function execution card of the migration destination, the transfer engine control unit 1101-1 ends the process. In this embodiment, because the network device having the function execution card of the migration target has the function execution card of the migration destination, S106 is not executed and the process ends. S106 will be described in detail in a second embodiment.

By the configuration described above, in the network device 100-1, the CP and the DP mounting the same extension function operated by the function execution card 3000-1 can be migrated to other function execution card 3000-2.

Second Embodiment

Figure 18:
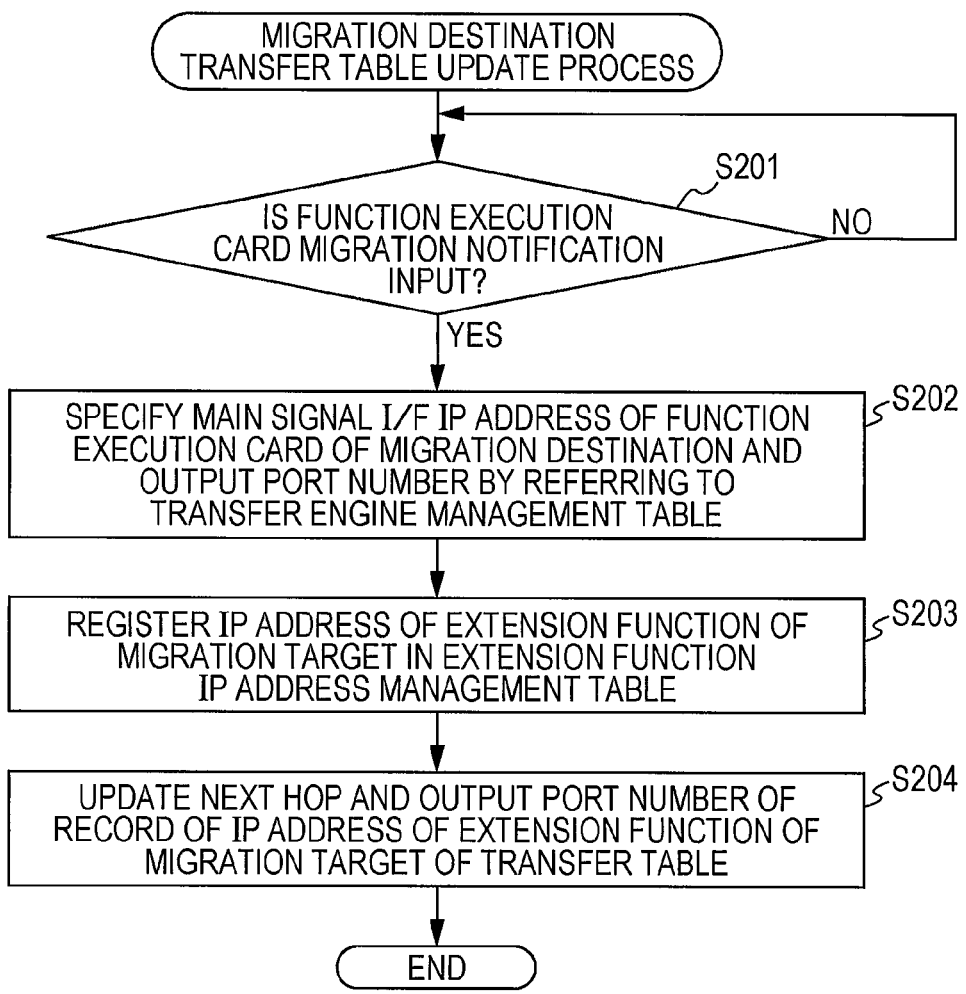
FIG. 18 is a flowchart of a migration destination transfer table update process according to a second embodiment.

The second embodiment will be described using FIG. 18.

In this embodiment, migration of an extension function over a network device will be described. Specifically, migration of an extension function from a function execution card 3000-1 of a network device 100-1 to a function execution card 3000-3 of a network device 100-2 will be described.

In this embodiment, only processes different from the processes of the first embodiment will be described.

First, a schematic configuration of this embodiment will be described using FIG. 14.

In this embodiment, different from the first embodiment, a migration instruction includes an extension function ID "A" of a migration target and a function execution card ID "3" of a migration destination. That is, the migration instruction is an instruction to migrate an extension function A mounted on the function execution card 3000-1 of the network device 100-1 to the function execution card 3000-3 of other network device 100-2.

In S15, a DP migration notification is transmitted to the function execution card 3000-3 and in S16, a migration control unit of the function execution card 3000-3 executes a DP start process (refer to FIG. 16).

In S18, a transfer engine control unit 1101-1 executes a transfer table update process (refer to FIG. 17). Here, because the network device 100-2 other than the network device 100-1 has the function execution card 3000-3 of the migration destination, the transfer engine control unit 1101-1 transmits a function execution card migration notification to the network device 100-2 of the migration destination. The function execution card migration notification includes a function execution card ID of the migration destination, an extension function ID of a migration target, and an IP address of an extension function of the migration target.

When the network device 100-2 receives a function execution card migration notification, a transfer engine control unit of a basic control unit 1000-2 executes a migration destination transfer table update process. The migration destination table update process will be described in detail with reference to FIG. 18.

The transfer table update process according to this embodiment will be described using FIG. 17.

In S105, it is determined that other network device has the function execution card of the migration destination and the transfer engine control unit 1101-1 proceeds to S106.

In S106, the transfer engine control unit 1101-1 transmits a function execution card migration notification including a function execution card ID "3" of the migration destination, the extension function ID "A" of the migration target, and an IP address "10.1.1.1" of an extension function of the migration target specified by S103 to a transmission engine control unit of the basic control unit 1000-2 of the network device 100-2 of the migration destination (S106) and ends the process.

Next, the migration destination transfer table update process will be described using FIG. 18. FIG. 18 is a flowchart of the migration destination transfer table update process according to the second embodiment.

First, the transfer engine control unit of the basic control unit 1000-2 determines whether the function execution card migration notification is input (S201). The function execution card migration notification includes the function execution card ID "3" of the migration destination, the extension function ID "A" of the migration target, and the IP address "10.1.1.1" of the extension function of the migration target.

When it is determined in S201 that the function execution card migration notification is not input, the transfer engine control unit of the basic control unit 1000-2 returns to S201 and redetermines whether the function execution card migration notification is input.

When it is determined in S201 that the function execution card migration notification is input, the transfer engine control unit of the basic control unit 1000-2 specifies an P address of a function execution card of a function execution card ID included in the function execution card migration notification and a port number of an output destination, by referring to an association of the function execution card ID, the IP address of the function execution card, and the port number of the output destination (S202).

The basic control unit 1000-2 of the network device 100-2 has the same transfer engine management table as the transfer engine management table 1104-1 illustrated in FIG. 6. For this reason, in S202, the transfer engine control unit of the basic control unit 1000-2 specifies a main signal I/F IP address "192.168.102.2" and an output destination port number "102" of a record in which a function execution card ID "2" of the migration destination is registered in a function execution card ID 11041 of a transfer engine management table 1104-1, similar to S102.

Next, the transfer engine control unit of the basic control unit 1000-2 adds a new record to an extension function IP address management table, registers the extension function ID "A" of the migration target included in the input function execution card migration notification in an extension function ID 11031 of the added record, and registers the IP address "10.1.1.1" of the extension function of the migration target included in the input function execution card migration notification in the IP address 11032 of the record (S203).

Next, the transfer engine control unit of the basic control unit 1000-2 updates a transfer table 2100-2 such that an output destination of a packet to the IP address of the extension function of the migration target becomes the function execution card 3000-3 of the migration destination (S204).

Specifically, the transfer engine control unit of the basic control unit 1000-2 registers the main signal I/F IP address "192.168.102.2" specified by S202 in a next hop 21002 of a record in which the IP address "10.1.1.1" of the extension function of the migration target included in the input function execution card migration notification is registered in a destination IP address 21001 of the transfer table 2100-2 and registers the output destination port number "102" specified by S202 in an output destination port number 21003 of the record. Thereby, the network device 100-2 can transfer a packet to the extension function becoming the migration target to the function execution card 3000-2 of the migration destination.

By the configuration described above, the CP and the DP mounting the same function operated by the function execution card 3000-1 can be migrated to other function execution card 3000-3 over the network device.

Third Embodiment

The third embodiment will be described using FIGS. 19 and 20.

In this embodiment, a CP, a DP, and a microcode of a PE mounted line card mount an extension function in cooperation with each other. For this reason, in this embodiment, the CP, the DP, and the microcode cooperate with each other and migrate to a function execution card of a migration destination and a PE mounted line card of a network device having the function execution card.

Hereinafter, an example of the case in which a CP and a DP operated by a function execution card 3000-1 are migrated to a function execution card 3000-3 and a microcode of a PE mounted line card 4000-1 (PE mounted line card ID "1") is migrated to a PE mounted line card 4000-2 (PE mounted line card ID "2") will be described.

In this embodiment, only processes different from the processes of the first and second embodiments will be described.

An extension function A cooperates with a function type identified by a function type ID "1" of a microcode 4210-1 of the PE mounted line card 4000-1 and an extension function B cooperates with a function type identified by a function type ID "2" of the microcode 4210-1 of the PE mounted line card 4000-1.

In this embodiment, similar to the second embodiment, a migration instruction includes an extension function ID "A" of a migration target and a function execution card ID "3" of a migration destination.

In a target DP stop process of S14 illustrated in FIG. 14, because the extension function A becoming the migration target cooperates with a function of the microcode of the PE mounted line card 4000-1, a migration control unit 3104-1 outputs a function type migration notification to the PE mounted line card 4000-1.

This process will be described in detail using FIG. 15.

In S507, the migration control unit 3104-1 determines whether a PE mounted line card cooperating with an extension function of the migration target exists, by referring to an association of an extension function ID of the migration target and a PE mounted line card ID. Specifically, the migration control unit 3104-1 determines whether a record in which the extension function ID of the migration target is registered in an extension function ID 31092 exists, by referring to a PE mounted line card correspondence management table 3109-1. In this embodiment, a record in which an extension function ID "A" is registered in the extension function ID 31092 of the PE mounted line card correspondence management table 3109-1 exists and a PE mounted line card ID "1" is registered in the PE mounted line card ID 31091 of the record. Therefore, the migration control unit 3104-1 determines that the PE mounted line card cooperating with the extension function of the migration target exists and proceeds to S508.

In S508, the migration control unit 3104-1 outputs a function type migration notification including the extension function ID "A" of the migration target, a function execution card ID "3" of the migration destination, the cooperating PE mounted line card ID "1", and a cooperating function type ID "1" to a PE mounted line card control unit 1102-1 of a basic control unit 1000-1, proceeds to S509, and ends the process.

The cooperating function type ID "1" is acquired from a function type ID 31093 of a record in which the extension function ID "A" is registered in the extension function ID 31092 of the PE mounted line card correspondence management table 3109-1.

Figure 19:
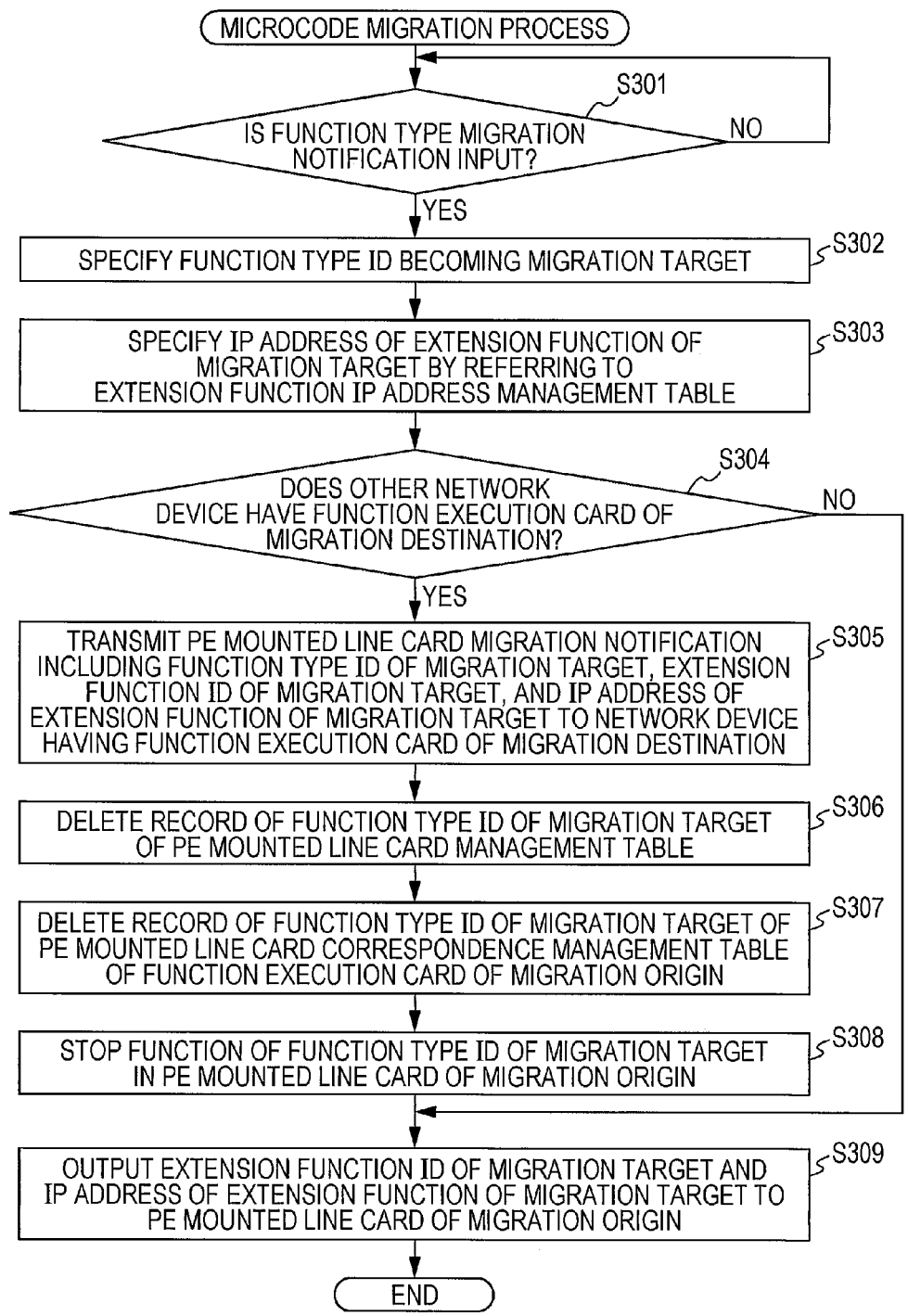
FIG. 19 is a flowchart of a microcode migration process according to a third embodiment.
Figure 20:
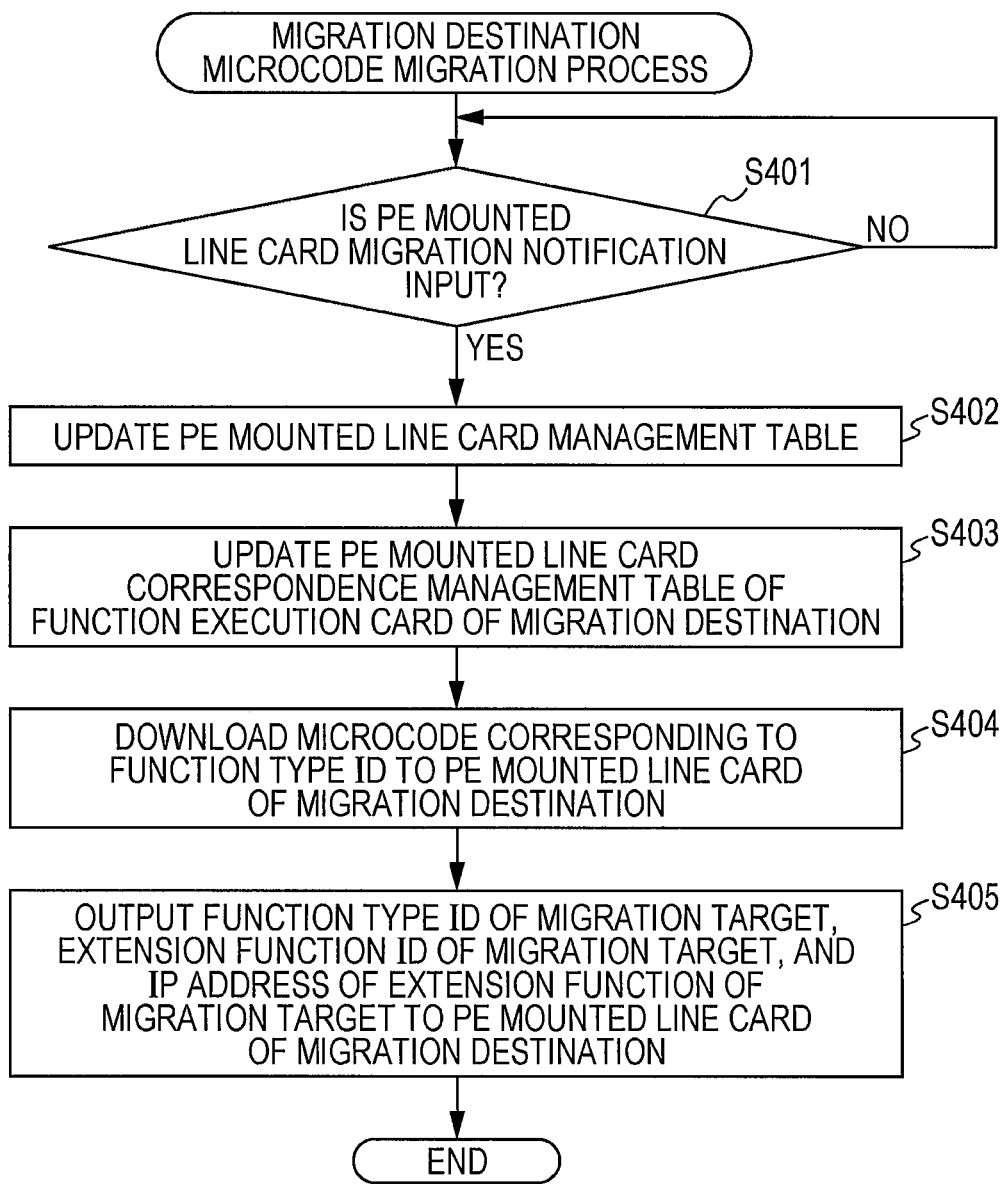
FIG. 20 is a flowchart of a migration destination microcode migration process according to the third embodiment.

Next, the PE mounted line card control unit 1102-1 executes a microcode migration process illustrated in FIG. 19, when the function type migration notification is input.

FIG. 19 is a flowchart of the microcode migration process according to the third embodiment.

First, the PE mounted line card control unit 1102-1 determines whether the function type migration notification is input (S301).

When it is determined in S301 that the function type migration notification is not input, the PE mounted line card control unit 1102-1 returns to S301 and redetermines whether the function type migration notification is input.

When it is determined in S301 that the function type migration notification is input, the PE mounted line card control unit 1102-1 specifies the cooperating function type ID "1" included in the input function type migration notification as a function type ID becoming the migration target (S302).

Next, the PE mounted line card control unit 1102-1 specifies an IP address of the extension function of the migration target, by referring to an association of the extension function ID and the IP address of the extension function (S303).

Specifically, the PE mounted line card control unit 1102-1 specifies an IP address "10.1.1.1" of a record in which an extension function ID "A" of the migration target is registered in the extension function ID 11031 of the extension function IP address management table 1103-1.

Next, the PE mounted line card control unit 1102-1 determines whether other network device has a function execution card of the migration destination (S304). Because this process is the same as the process of S105 illustrated in FIG. 17, detailed description thereof is omitted.

When it is determined in S304 that other network device does not have the function execution card of the migration destination, the PE mounted line card control unit 1102-1 does not need to migrate a microcode of the PE mounted line card 4000-1, does not execute S305 to S308, and proceeds to S309. When it is determined in S304 that other network device has the function execution card of the migration destination, the PE mounted line card control unit 1102-1 proceeds to S305. In this embodiment, because other network device 100-2 has the function execution card 3000-3 of the migration destination, the PE mounted line card control unit 1102-1 proceeds to S305.

In S305, the PE mounted line card control unit 1102-1 transmits a PE mounted line card migration notification including the function type ID "1" of the migration target, the extension function ID "A" of the migration target, and the IP address "10.1.1.1" of the extension function of the migration target to the network device 100-2 having the function execution card 3000-3 of the migration destination. If the network device 100-2 receives the PE mounted line card migration notification and the received PE mounted line card migration notification is input to a PE mounted line card control unit of the basic control unit 1000-2 of the network device 100-2, the PE mounted line card control unit executes a migration destination microcode migration process illustrated in FIG. 20. The migration destination microcode migration process will be described in detail with reference to FIG. 20.

Next, because a function of a microcode identified by the function type ID "1" of the migration target is migrated to the PE mounted line card 4000-2 of the network device 100-2, the PE mounted line card control unit 1102-1 deletes a record of the function type ID "1" of the migration target of the PE mounted line card management table 1105-1 (S306).

Next, the PE mounted line card control unit 1102-1 deletes the record of the function type ID "1" of the migration target of the PE mounted line card correspondence management table 3109-1 of the function execution card 3000-1 of the migration origin (S307).

Next, the PE mounted line card control unit 1102-1 stops a function of the microcode 4210-1 identified by the function type ID of the migration target in the PE mounted line card 4000-1 (S308).

Next, the PE mounted line card control unit 1102-1 outputs the extension function ID of the migration target and the IP address of the extension function of the migration target to the PE mounted line card 4000-1 (S309) and ends the process.

When information output by S309 is input, the PE mounted line card 4000-1 deletes a record in which extension function ID of the migration target or the IP address of the extension function of the migration target of the extension function IP address table 4102-1 is registered.

A migration destination microcode migration process will be described using FIG. 20. FIG. 20 is a flowchart of the migration destination microcode migration process according to the third embodiment.

First, the PE mounted line card control unit of the basic control unit 1000-2 of the network device 100-2 determines whether the PE mounted line card migration notification is input (S401). The PE mounted line card migration notification includes a function type ID "1" of the migration target, an extension function ID "A" of the migration target, and an IP address "10.1.1.1" of the extension function of the migration target.

When it is determined in S401 that the PE mounted line card migration notification is not input, the PE mounted line card control unit of the basic control unit 1000-2 returns to S401 and redetermines whether the PE mounted line card migration notification is input.

Meanwhile, when it is determined in S401 that the PE mounted line card migration notification is input, the PE mounted line card control unit of the basic control unit 1000-2 updates a PE mounted line card management table of the basic control unit 1000-2. Specifically, the PE mounted line card control unit of the basic control unit 1000-2 adds a new record to the PE mounted line card management table, registers identification information (PE mounted line card ID "2") of the PE mounted line card 4000-2 of the network device 100-2 in a PE mounted line card ID 11051 of the added record, and registers the function type ID "1" in a function type ID 11052.

Next, the PE mounted line card control unit of the basic control unit 1000-2 updates the PE mounted line card correspondence management table of the function execution card 3000-3 of the migration destination. Specifically, the PE mounted line card control unit 1102-2 adds a new record to the PE mounted line card correspondence management table, registers a PE mounted line card ID "2" in a PE mounted line card ID 31091 of the added record, registers an extension function ID "A" of the migration target included in the PE mounted line card migration notification in an extension function ID 31092, and registers a function type ID "1" of the migration target included in the PE mounted line card migration notification in a function type ID 31093.

Next, the PE mounted line card control unit of the basic control unit 1000-2 downloads a microcode corresponding to the function type ID "1" held by the basic control unit 1000-2 to the PE mounted line card 4000-2 and starts the PE mounted line card 4000-2 by a function of the function type ID "1" (S404).

Next, the PE mounted line card control unit of the basic control unit 1000-2 outputs the function type ID "2" of the migration target, the extension function ID "A" of the migration target, and the IP address "10.1.1.1" of the extension function of the migration target to the PE mounted line card 4000-2 of the migration destination (S405) and ends the process.

When information output by S405 is input, the PE mounted line card 4000-2 adds a new record to the extension function IP address table of the PE mounted line card 4000-2 and registers the extension function ID "A" of the migration target and the IP address "10.1.1.1" of the extension function of the migration target in the added record.

By the configuration described above, the extension function A migrates from the function execution card 3000-1 to the function execution card 3000-3, so that the function of the microcode cooperating with the extension function A can be migrated from the PE mounted line card 4000-1 to the PE mounted line card 4000-2.

Fourth Embodiment

The fourth embodiment will be described using FIG. 22. In this embodiment, the case in which an extension function mounted on a server is migrated to a different server connected by a network device such as a switch will be described.

Figure 22:
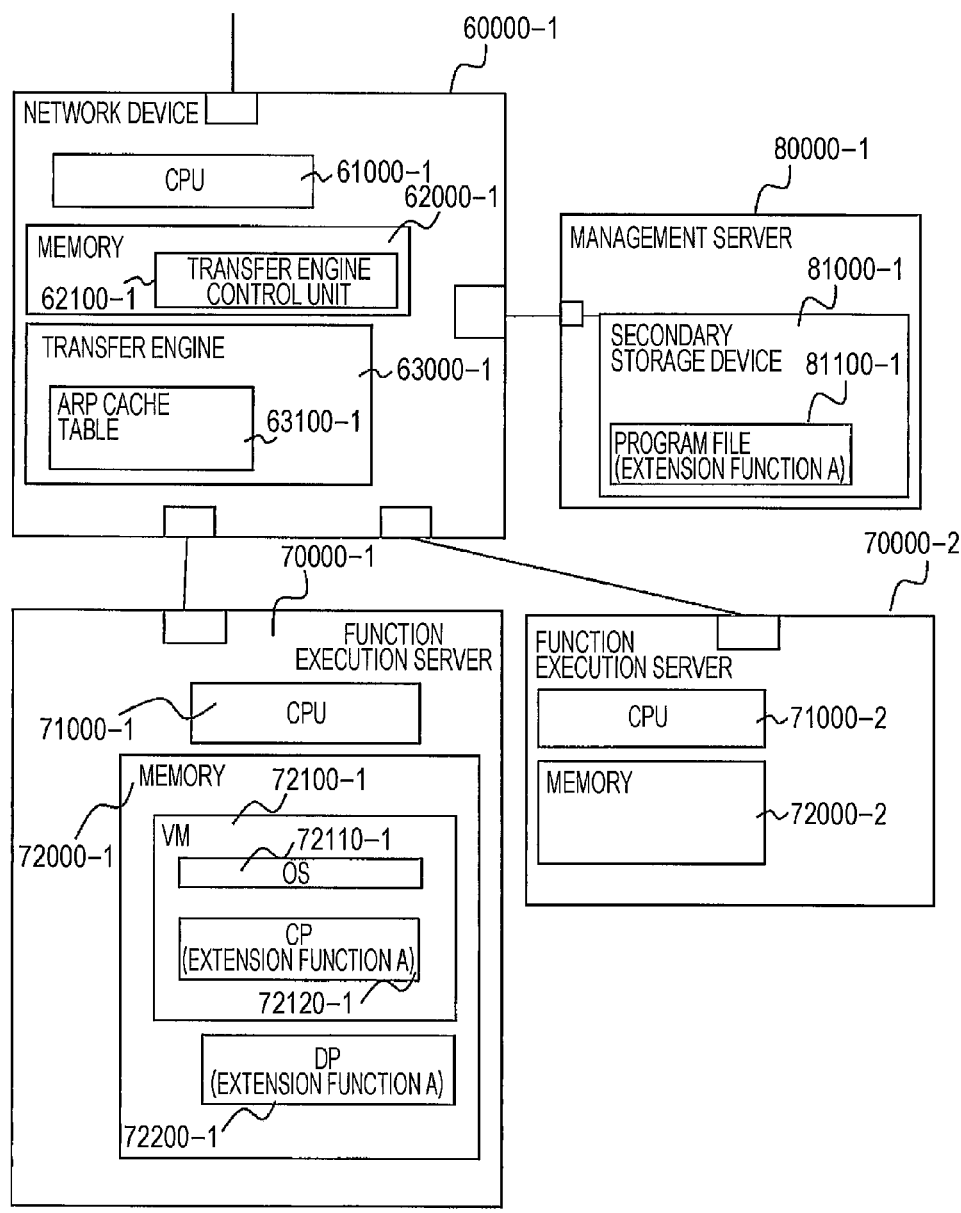
FIG. 22 is a diagram illustrating a system configuration according to a fourth embodiment.

FIG. 22 is a diagram illustrating a network relay system according to the fourth embodiment.

The network relay system has a network device 60000-1 and a function execution server 70000-1, a function execution server 70000-2, and a management server 80000-1 are connected through the network device 60000-1.

The network device 60000-1 will be described. The network device 60000-1 has a CPU 61000-1, a memory 62000-1, and a transfer engine 63000-1.

A transfer engine control unit 62100-1 operated on the memory 62000-1 controls an ARP cache table 63100-1 on the transfer engine 63000-1. The transfer engine 63000-1 determines a destination MAC address of a packet transmitted by the network device 60000-1, by referring to the ARP cache table 63100-1. The ARP cache table 63100-1 holds an association of an IP address of the destination of the packet and a MAC address.

Function execution units executing the extension functions can be mounted on the function execution servers 70000-1 and 70000-2. FIG. 22 illustrates a state in which the function execution unit is mounted on the function execution server 70000-1 and the function execution unit is not mounted on the function execution server 70000-2. A function of a control system requiring multifunctionality among extension functions is mounted on a control plane (CP) 72120-1 and a function of a transfer system requiring single functionality and high-speed performance is mounted on a data plane (DP) 72200-1. The CP 72120-1 and the DP 72200-1 cooperate with each other and an extension function A is mounted. For example, when an extension function is provided in cooperation with a server, the CP 72120-1 executes control communication with the server to set resources necessary for a data transfer process, the CP 72200-1 shares resource information set by the control communication, and the DP 72200-1 executes a high-speed data transfer process according to the information. The DP 72200-1 temporarily holds data during the transfer and does not execute a permanent information process. That is, a process of the DP 72200-1 is executed according to a result or a situation of the process of the CP 72120-1. The CP 72120-1 is provided by an OS 72110-1 operated by a virtual machine (VM) 72100-1 constructed on a memory 72000-1 included in the function execution server 70000-1. In addition, the DP 72200-1 is operated at the outside of the virtual machine 72100-1.

A secondary storage device 81000-1 mounted on the management server 80000-1 stores a program file 81100-1 of the extension function mounted on the function execution server.

The network device 60000-1 may be connected to other switches not illustrated in the drawings and may be connected to other servers or terminals not illustrated in the drawings.

In addition, the function execution server is described. However, the function execution server is not limited to a server and may be a module mounted on the network device.

In this embodiment, an operation for migrating the extension function A mounted on the function execution server 70000-1 to the function execution server 70000-2 will be described.

First, the management server 80000-1 has access to the function execution server 70000-1 using a protocol such as telnet and copies the VM 72100-1 operated by a memory 72000-1 into the secondary storage device 81000-1 of the management server 80000-1. Then, the management server 80000-1 stops the extension function A.

Next, the management server 80000-1 has access to the function execution server 70000-2 using the protocol such as telnet and develops the VM 72100-1 copied into the secondary storage device 81000-1 of the management server 80000-1 by the process on a memory 72000-2 of the function execution server 70000-2. In addition, the management server 80000-1 develops a program file 81100-1 of the extension function A stored in the secondary storage device 81000-1 of the management server 80000-1 on the memory 72000-2 of the function execution server 70000-2 and starts the extension function A.

The extension function A started by the function execution server 70000-2 transmits Gratuitous ARP to the network device 60000-1. The transfer engine control unit 62100-1 of the network device 60000-1 having received the Gratuitous ARP updates the ARP cache table 63100-1 and a packet to the extension function A received by the network device 60000-1 is transferred to the function execution server 70000-2.

The CP 72120-1 of the extension function A to be the migration target is configured from a program and data. As described above, the CP 72120-1 shares the data with the DP 72200-1 to realize a function. The CP 72120-1 migrated to the function execution server 70000-2 is configured from a program and data equal to the program and the data operated by the function execution server 70000-1 before the migration and can be operated.

Meanwhile, the DP 72200-1 of the extension function A is configured from a program and data, similar to the CP, and data transferred at the present time is temporarily stored in the data. The DP started by the function execution server 70000-2 is started from the same program file 81100-1 stored in the management server 80000-1. However, the data operated by the function execution server before the migration cannot be migrated. As described above, because the data transferred at the present time is temporarily stored in the data, the packet on which the transfer process is executed may be lost at the time of the migration. However, entire data necessary for an operation of the extension function A is managed in the data of the CP 72120-1. Therefore, in the following transfer process, an operation is enabled without interruption. The present invention is not limited to the embodiments described above and various modifications are included in the present invention. For example, the embodiments are described in detail to facilitate the description of the present invention and are not limited to embodiments in which all of the described configurations are included. In addition, a part of the configurations of the certain embodiment can be replaced by the configurations of another embodiment or the configurations of another embodiment can be added to the configurations of the certain embodiment. In addition, for a part of the configurations of the individual embodiments, other configurations can be added, deleted, and replaced.

In addition, a part or all of the individual configurations, functions, processing units, and processing mechanisms may be designed by integrated circuits and may be realized by hardware. In addition, the individual configurations and functions may be realized by software by analyzing programs for realizing the functions by a processor and executing the programs by the processor. Information such as the programs, the tables, and the files for realizing the individual functions and the data may be stored in a recording device such as a memory, a hard disk, and a solid state drive (SSD) or a recording medium such as an IC card, an SD card, and a DVD.

In addition, only control lines or information lines necessary for explanation are illustrated and the control lines or information lines do not mean all control lines or information lines necessary for a product. In actuality, almost all configurations may be connected to each other.

What is claimed is:

1. A communication device that is connected to a network and exchanges packets with the network, the communication device comprising:
    a transfer control unit that executes an exchange process of the packets with the network; and
    a function execution module that has a physical processor, wherein a transfer table in which a relation of destinations of the packets and output destinations of the packets is registered is held,
    the function execution module has a plurality of process execution units mounting a predetermined extension function,
    the extension function is mounted by cooperation of a first process execution unit executing a first process and a second process execution unit executing a second process, among the plurality of process execution units,
    operation resources of the physical processor are allocated to the first process execution unit and the second process execution unit,
    memory resources of the physical processor are allocated to a program and data of the first process execution unit and a program and data of the second process execution unit,
    the first process execution unit is operated on a virtual machine constructed on the function execution module,
    the second process execution unit is operated outside the virtual machine on which the first process execution unit is operated,
    the communication device migrates the first process execution unit operated by the function execution module to a function execution module of a migration destination,
    the function execution module notifies the function execution module of the migration destination of information regarding the program allocated to the second process execution unit and information regarding allocation of the physical processor,
    the function execution module of the migration destination downloads a program file to start the second process execution unit, on the basis of the notified information regarding the program, operates a program of a new second process execution unit by the function execution module of the migration destination, on the basis of the information regarding the allocation of the physical processor, and migrates the second process execution unit to the function execution module of the migration destination,
    the extension function is migrated to the function execution module of the migration destination by the migration of the first process execution unit and the second process execution unit to the function execution module of the migration destination,
    the transfer table is updated according to the migration of the extension function to the function execution module of the migration destination, and the function execution module of the migration destination is a function execution module included in other communication device different from the communication device.

2. The communication device according to claim 1, wherein an association of the first process execution unit and the second process execution unit cooperating with each other is held, when a migration instruction to migrate the extension function to the function execution module of the migration destination is received, the first process execution unit of the extension function is migrated to the function execution module of the migration destination, and the function execution module specifies the second process execution unit cooperating with the migrated first process execution unit, by referring to the association of the first process execution unit and the second process execution unit cooperating with each other, and migrates the specified second process execution unit to the function execution module of the migration destination to migrate the extension function to the function execution module of the migration destination.

3. The communication device according to claim 1, wherein the transfer table is updated by changing an output destination of a packet to the migrated extension function to the function execution module of the migration destination.

4. The communication device according to claim 1, wherein the transfer table is updated by changing an output destination of a packet to the migrated extension function to the function execution module of the migration destination, and a function execution module migration notification including information to specify the function execution module of the migration destination and identification information of the migrated extension function is transmitted to other communication device and a transfer table of other communication device is updated by changing the output destination of the packet to the migrated extension function to the function execution module of the migration destination by other network device.

5. The communication device according to claim 1, wherein the transfer control unit holds a program, the program includes a function of mounting the extension function in cooperation with the extension function, when the extension function is migrated to the function execution module of the migration destination, the function of the program cooperating with the extension function is specified as a function of a migration target, and the specified function of the migration target is migrated to a transfer control unit of other communication device.

6. The communication device according to claim 5, wherein information to specify a type of the specified function of the migration target is transmitted to other network device, a program including the type of the function is set to the transfer control unit of other communication device by other communication device, and the function of the migration target is migrated to the transfer control unit of other communication device.

7. The communication device according to claim 1, wherein the physical processor has a plurality of processor cores, at least one processor core is allocated to the second process execution unit, the information regarding the allocation of the physical processor allocated to the second process execution unit includes the number of processor cores allocated to the second process execution unit, and the function execution module of the migration destination allocates processor cores of the same number as the number of processor cores allocated to the specified second process execution unit to the same second process execution unit as the specified second process execution unit, on the basis of the information regarding the allocation to the function execution module of the migration destination.

8. A method of migrating an extension function in a communication device that is connected to a network and exchanges packets with the network, wherein the communication device includes a transfer control unit that executes an exchange process of the packets with the network and a function execution module that has a physical processor and mounts a predetermined function, the communication device has a transfer table that holds a relation of destinations of the packets and output destinations of the packets, the function execution module has a plurality of process execution units mounting a predetermined extension function, the extension function is mounted by cooperation of a first process execution unit executing a first process and a second process execution unit executing a second process, among the plurality of process execution units, operation resources of the physical processor are allocated to the first process execution unit and the second process execution unit and memory resources of the physical processor are allocated to a program and data of the first process execution unit and a program and data of the second process execution unit, the first process execution unit is operated on a virtual machine constructed on the function execution module, the second process execution unit is operated outside the virtual machine on which the first process execution unit is operated, and the method includes causing the communication device to migrate the first process execution unit on which the predetermined extension function operated by a function execution module of a migration origin is mounted to a function execution module of a migration destination, causing the function execution module of the migration origin to notify the function execution module of the migration destination of information regarding the program allocated to the second process execution unit and information regarding allocation of the physical processor, causing the function execution module of the migration destination to download a program file to start the second process execution unit, on the basis of the notified information regarding the program, operate a program of a new second process execution unit by the function execution module of the migration destination, on the basis of the information regarding the allocation, and migrate the second process execution unit of the extension function to the function execution module of the migration destination, migrating the extension function to the function execution module of the migration destination by the migration of the first process execution unit and the second process execution unit to the function execution module of the migration destination, and causing the communication device to update the transfer table according to the migration of the extension function to the function execution module of the migration destination, wherein the function execution module of the migration destination is a function execution module included in other communication device different from the communication device.

9. The communication method according to claim 8, further comprising:

holding an association of the first process execution unit and the second process execution unit cooperating with each other, when a migration instruction to migrate the extension function to the function execution module of the migration destination is received, migrating the first process execution unit of the extension function to the function execution module of the migration destination, and the function execution module specifying the second process execution unit cooperating with the migrated first process execution unit, by referring to the association of the first process execution unit and the second process execution unit cooperating with each other, and migrating the specified second process execution unit to the function execution module of the migration destination to migrate the extension function to the function execution module of the migration destination.

10. The communication method according to claim 8, wherein the transfer table is updated by changing an output destination of a packet to the migrated extension function to the function execution module of the migration destination.

11. The communication method according to claim 8, wherein the physical processor has a plurality of processor cores, at least one processor core is allocated to the second process execution unit, the information regarding the allocation of the physical processor allocated to the second process execution unit includes the number of processor cores allocated to the second process execution unit, and the communication method further comprises allocating, by the function execution module of the migration destination, processor cores of the same number as the number of processor cores allocated to the specified second process execution unit to the same second process execution unit as the specified second process execution unit, on the basis of the information regarding the allocation to the function execution module of the migration destination.

12. A communication system including a plurality of communication devices that are connected to a network and exchange packets with the network, wherein each of the communication devices includes a transfer control unit that executes an exchange process of the packets with the network, a function execution module that has a physical processor, and a control unit that controls the communication device, a transfer table in which a relation of destinations of the packets and output destinations of the packets is registered is held, the plurality of communication devices include a first communication device and a second communication device, the function execution module of the first communication device has a plurality of process execution units mounting a predetermined extension function, the extension function is mounted by cooperation of a first process execution unit executing a first process and a second process execution unit executing a second process, among the plurality of process execution units, the physical processor is allocated to the first process execution unit and the second process execution unit and memory resources of the physical processor are allocated to a program and data of the first process execution unit and a program and data of the second process execution unit, the first process execution unit is operated on a virtual machine constructed on the function execution module, the second process execution unit is operated outside the virtual machine on which the first process execution unit is operated, and when an extension function of the function execution module of the first communication device is migrated to a function execution module of the second communication device, the first communication device migrates the first process execution unit operated by the function execution module to the function execution module of the second communication device, the first communication device notifies the function execution module of the second communication device of information regarding the program allocated to the second process execution unit operated by the function execution module and information regarding allocation of the physical processor, the second communication device downloads a program file to start the second process execution unit, on the basis of the information regarding the program, operates a program of a new second process execution unit by the function execution module of the second communication device, on the basis of the information regarding the allocation, and migrates the second process execution unit from the function execution module of the first communication device to the function execution module of the second communication device, the extension function is migrated from the function execution module of the first communication device to the function execution module of the second communication device by the migration of the first process execution unit and the second process execution unit to the function execution module of the second communication device, and the first communication device and the second communication device update the transfer table according to the migration of the extension function.

13. The communication system according to claim 12, wherein an association of the first process execution unit and the second process execution unit cooperating with each other is held, when a migration instruction to migrate the extension function to the function execution module of the second communication device is received, the first process execution unit of the extension function is migrated to the function execution module of the second communication device, and the function execution module specifies the second process execution unit cooperating with the migrated first process execution unit, by referring to the association of the first process execution unit and the second process execution unit cooperating with each other, and migrates the specified second process execution unit to the function execution module of the second communication device to migrate the extension function to the function execution module of the second communication device.

14. The communication system according to claim 12, wherein the transfer table is updated by changing an output destination of a packet to the migrated extension function to the function execution module of the second communication device.

15. The communication system according to claim 12, wherein the physical processor has a plurality of processor cores, at least one processor core is allocated to the second process execution unit, the information regarding the allocation of the physical processor allocated to the second process execution unit includes the number of processor cores allocated to the second process execution unit, and the function execution module of the second communication device allocates processor cores of the same number as the number of processor cores allocated to the specified second process execution unit to the same second process execution unit as the specified second process execution unit, on the basis of the information regarding the allocation to the function execution module of the second communication device.

* * * * *